J. R. COMBS.
CHANGE MAKING MACHINE.
APPLICATION FILED MAY 4, 1916.

1,272,224.

Patented July 9, 1918.
19 SHEETS—SHEET 1.

WITNESSES
C. K. Reichenbach
J. C. Larsen

INVENTOR
James R. Combs
BY
Munn & Co.
ATTORNEYS

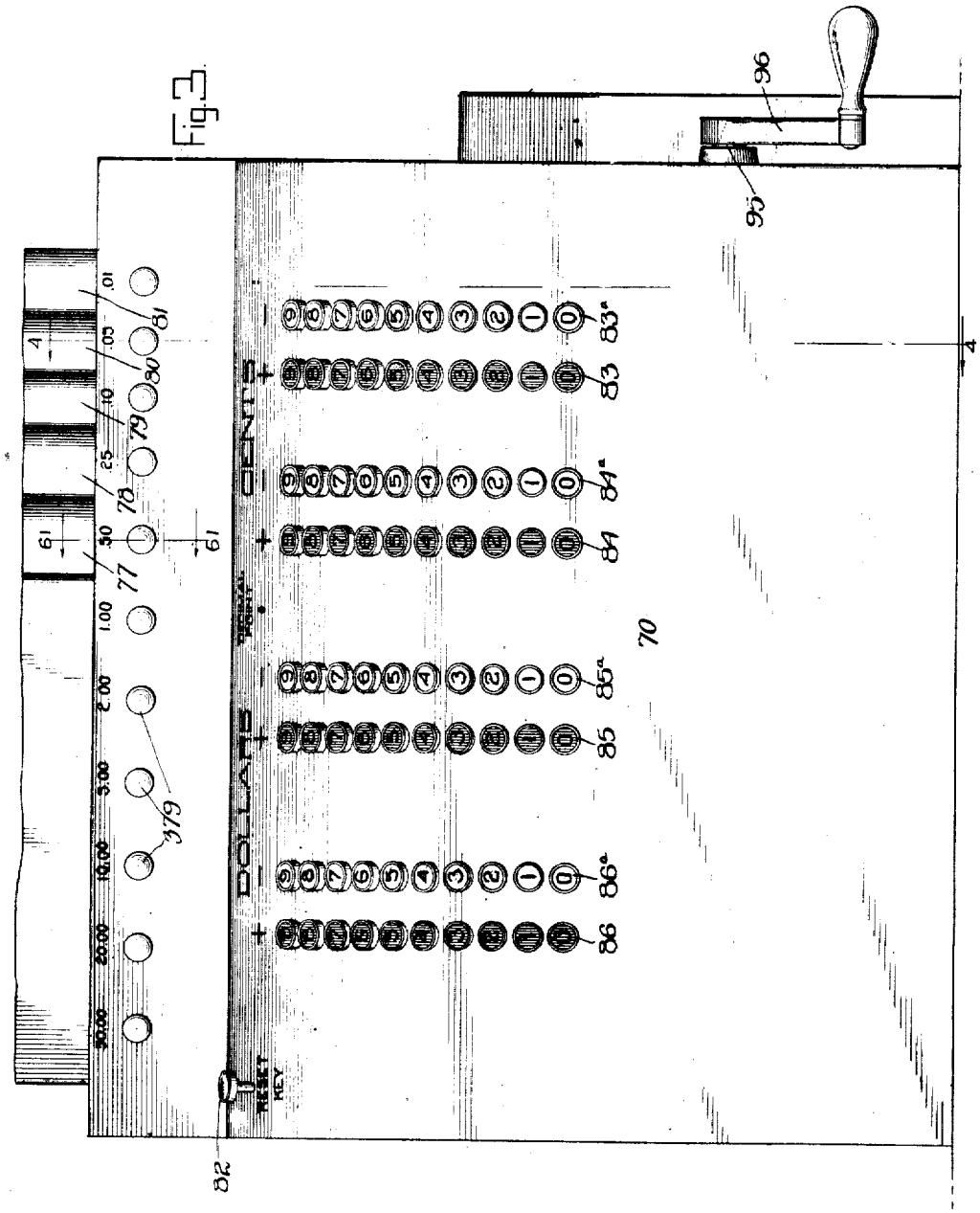

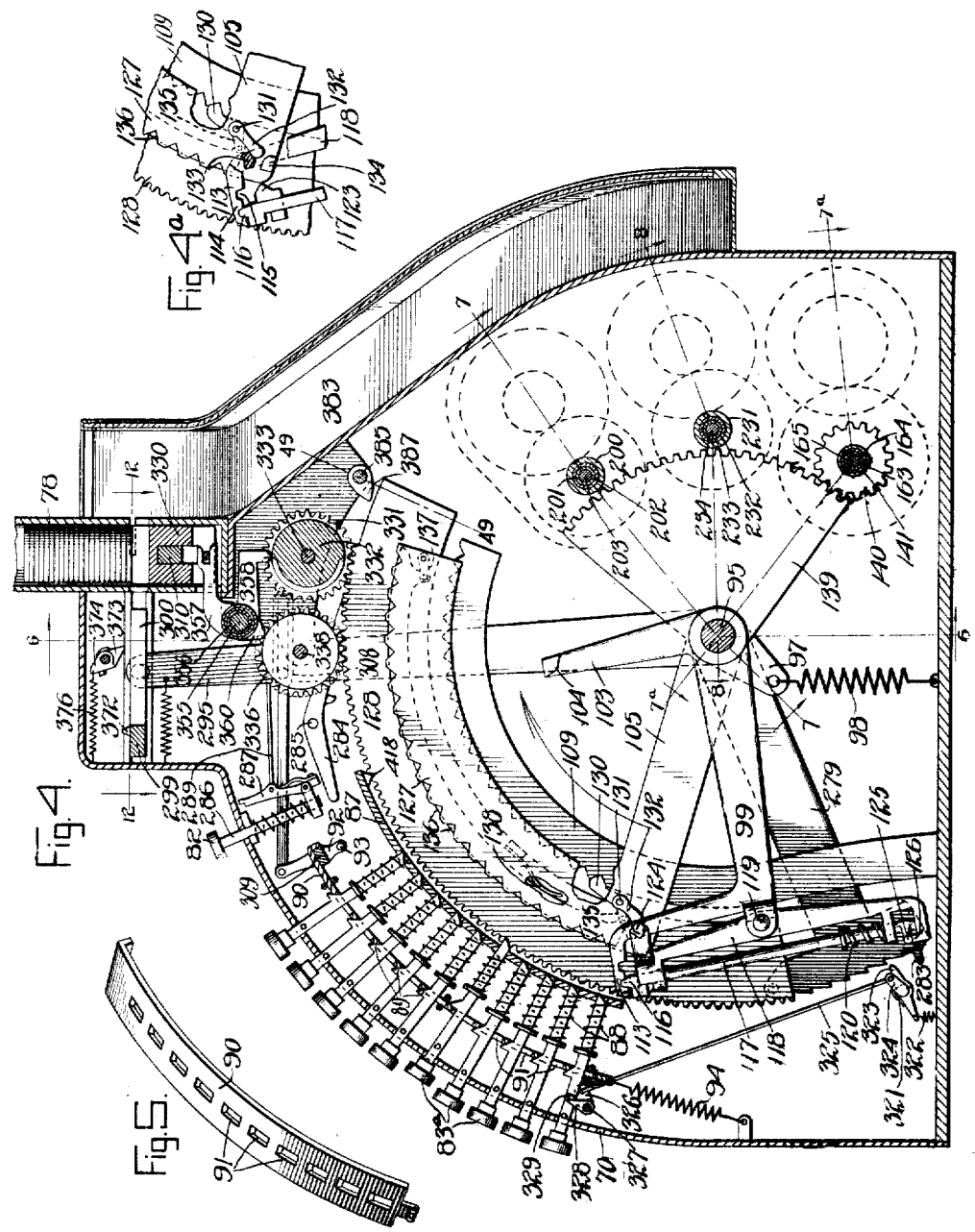

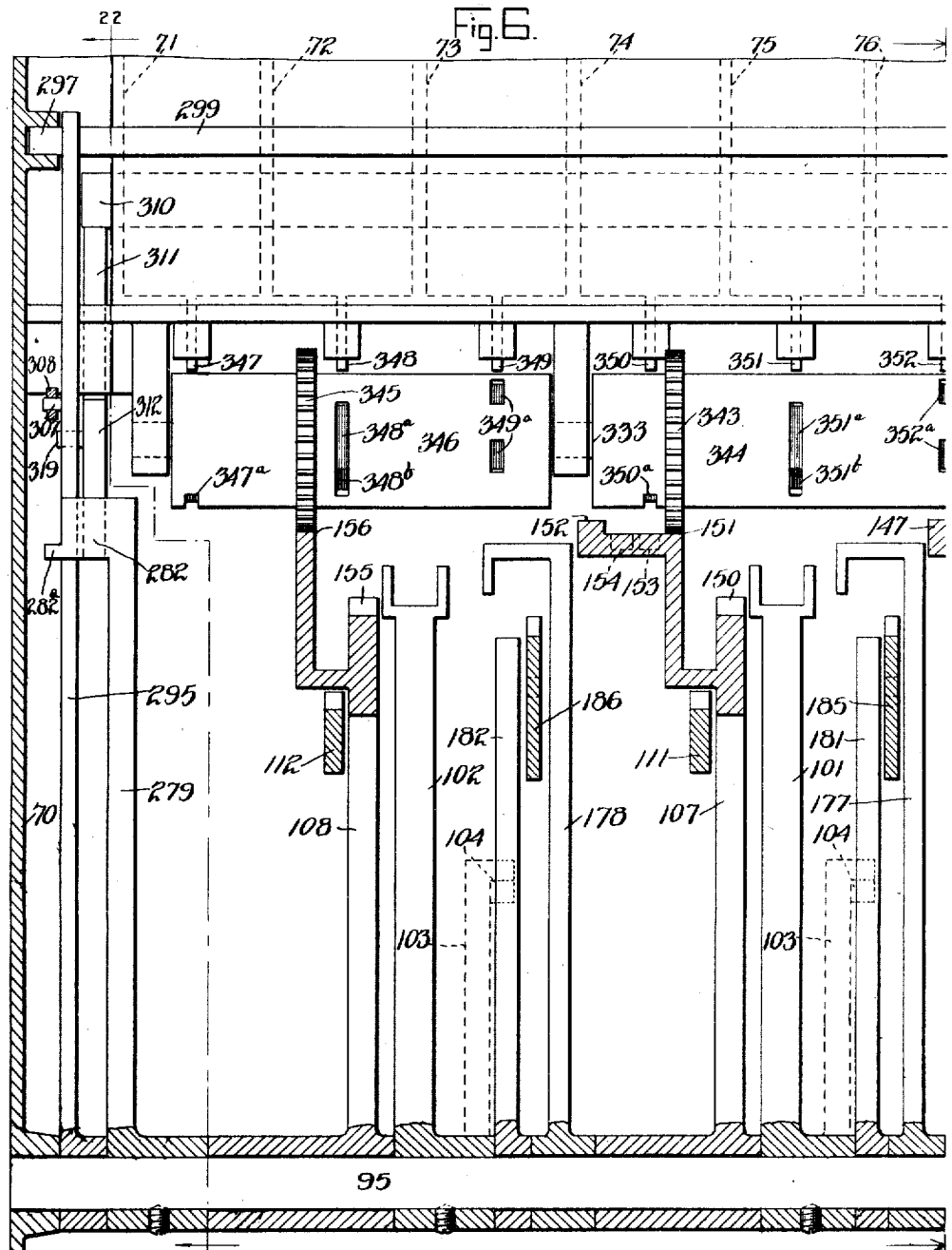

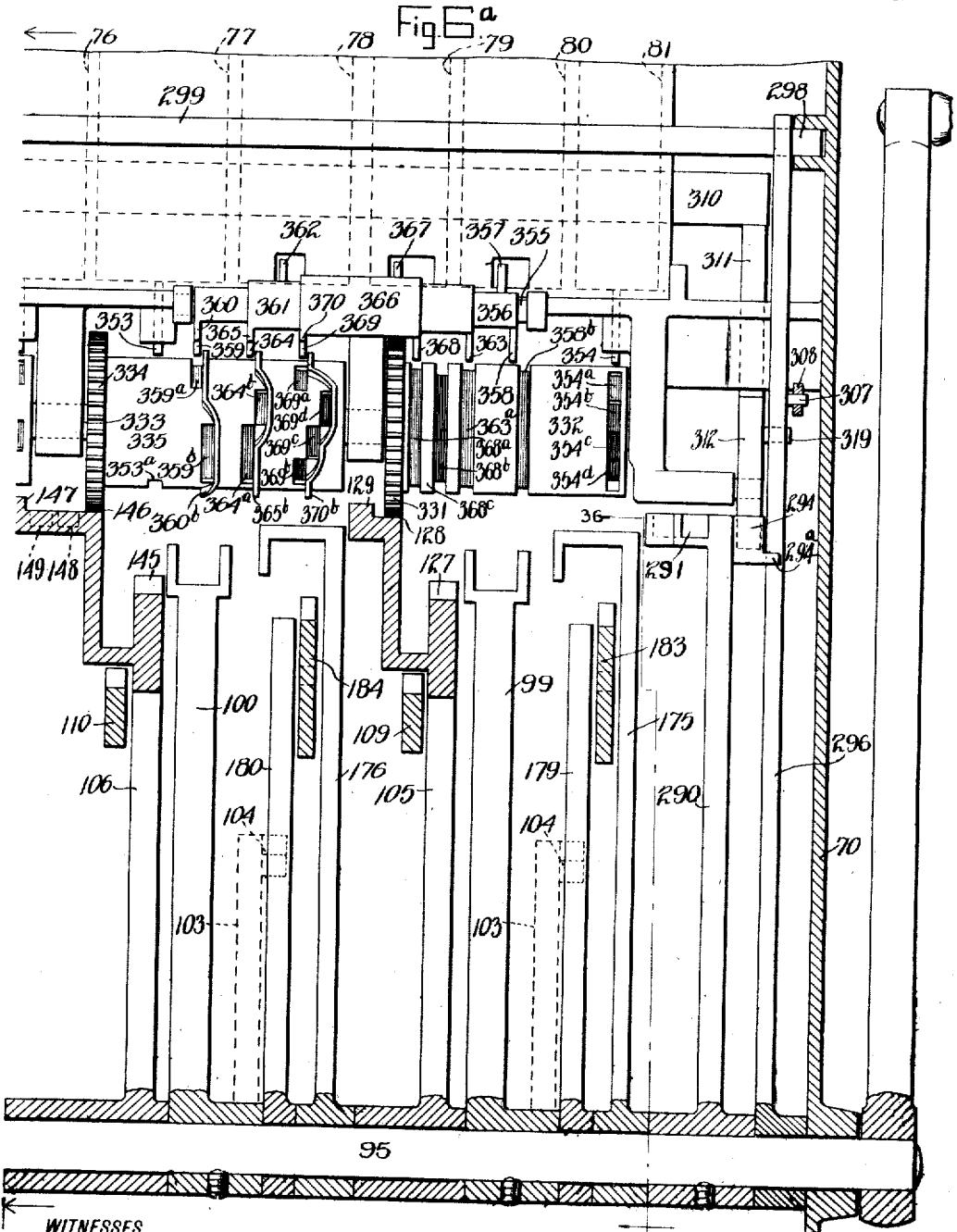

J. R. COMBS.
CHANGE MAKING MACHINE.
APPLICATION FILED MAY 4, 1916.
1,272,224.
Patented July 9, 1918.
19 SHEETS—SHEET 6.
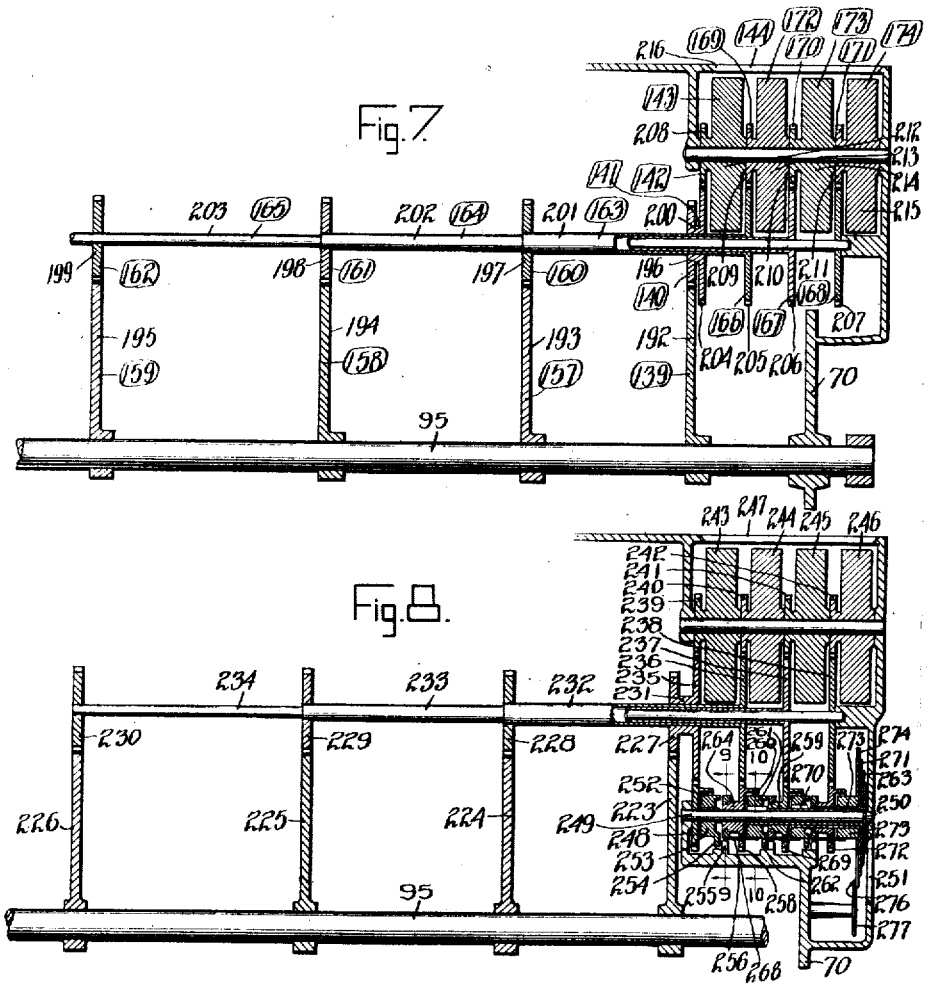
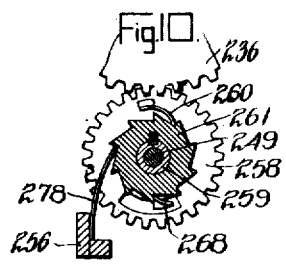
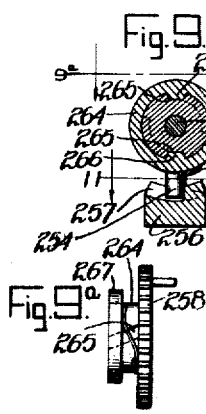
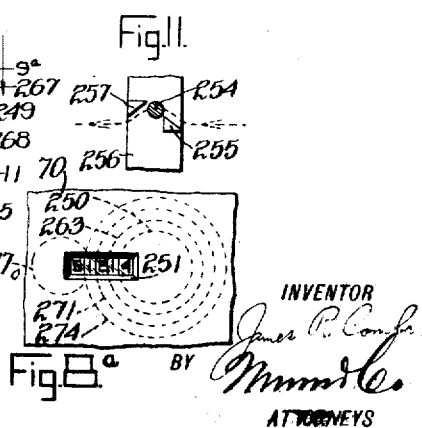

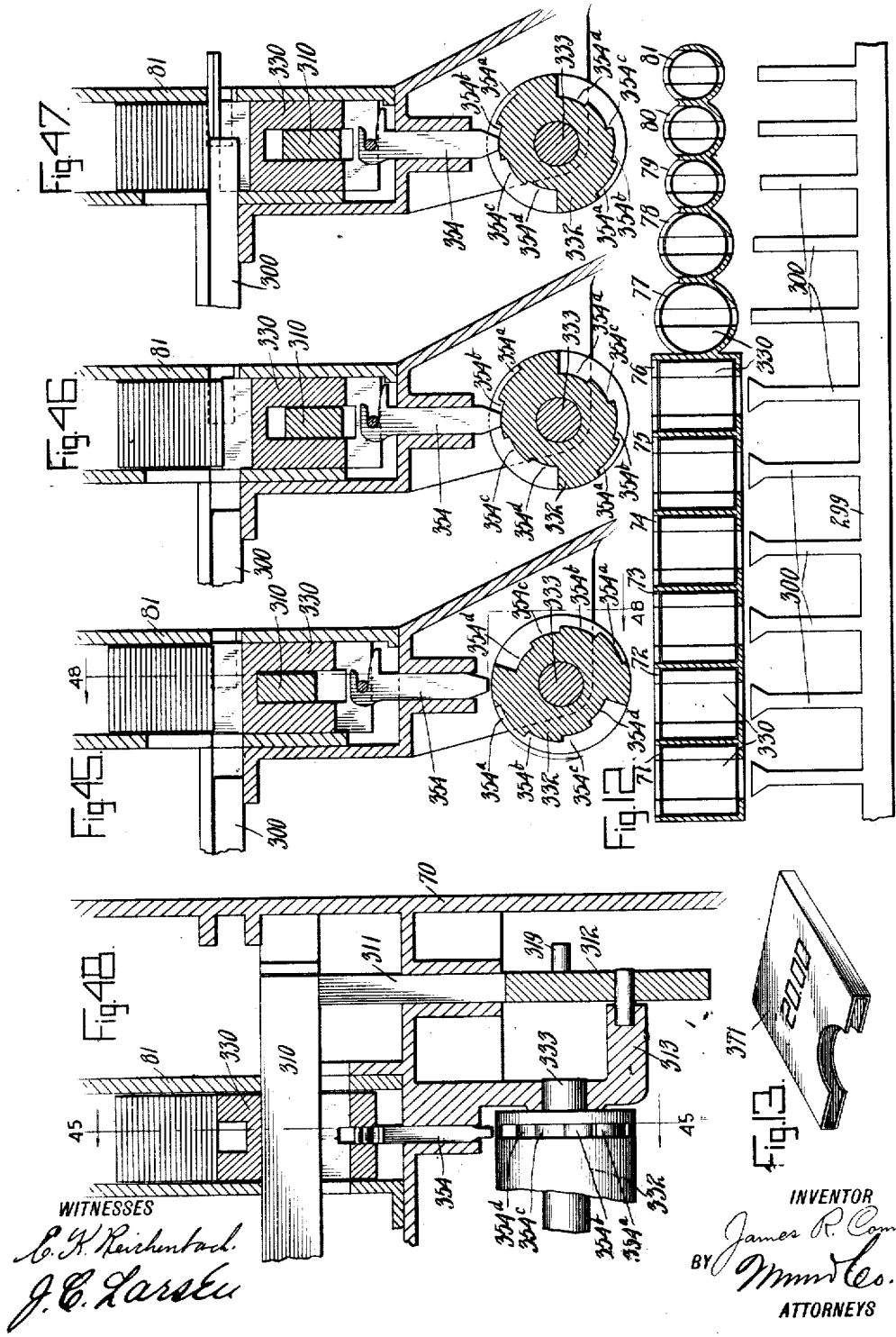

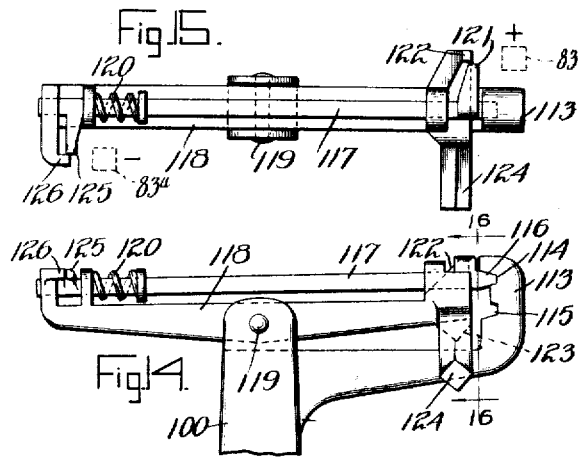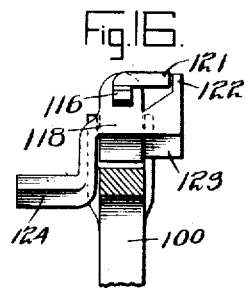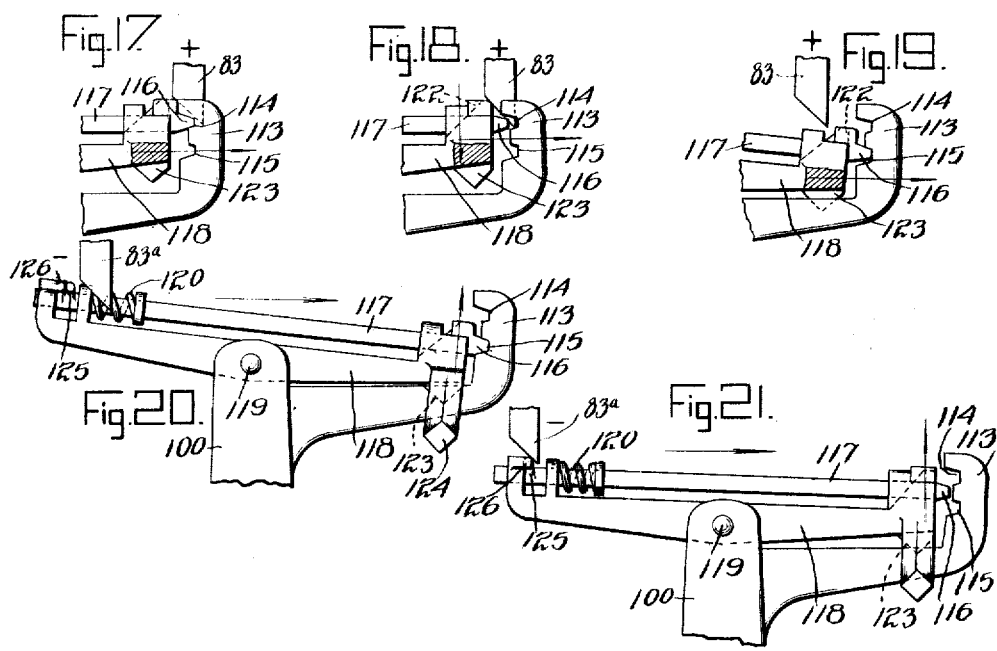

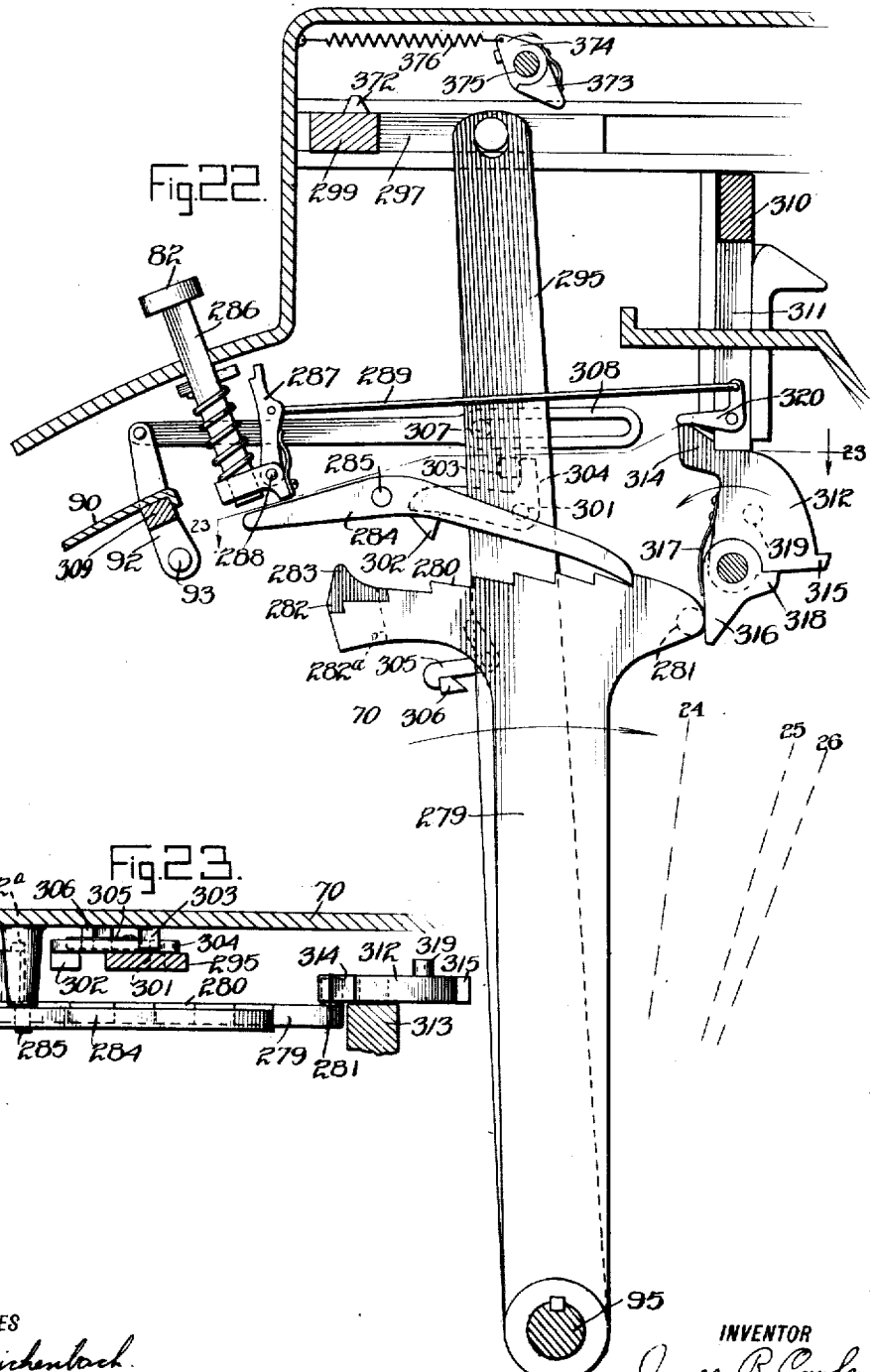

J. R. COMBS.
CHANGE MAKING MACHINE.
APPLICATION FILED MAY 4, 1916.

1,272,224.

Patented July 9, 1918.
19 SHEETS—SHEET 10.

WITNESSES
C. H. Reichenbach.
J. E. Larsen

INVENTOR
James R. Combs.
BY
Mmm Co
ATTORNEYS

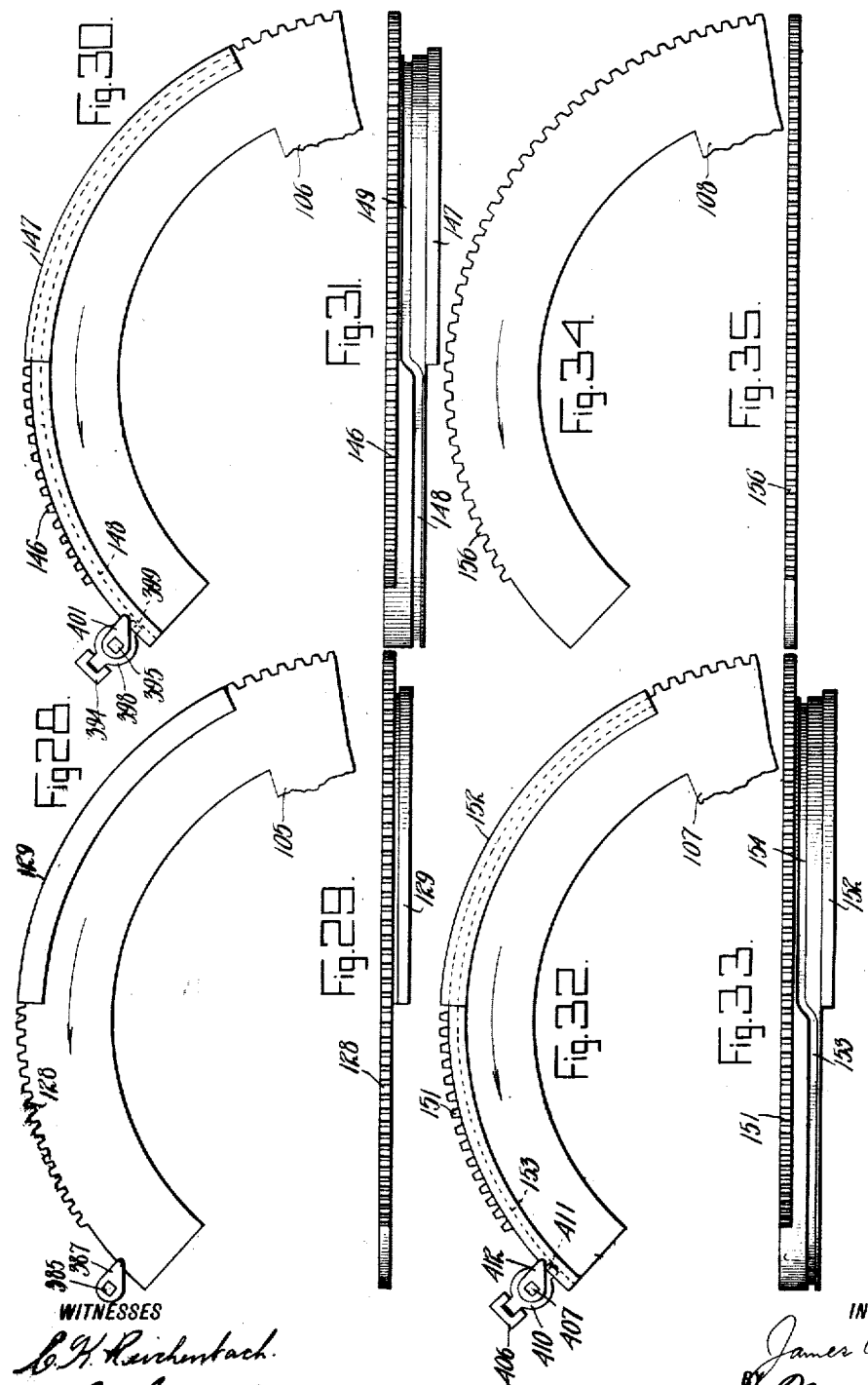

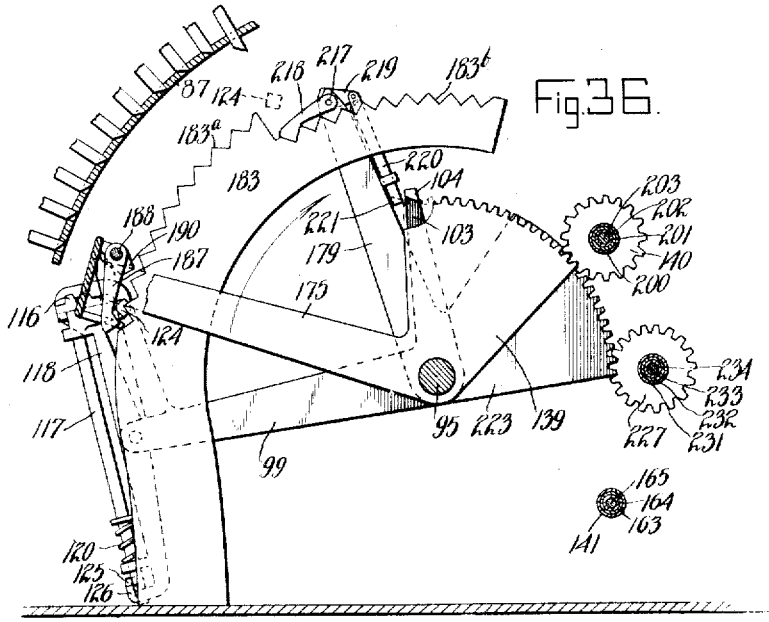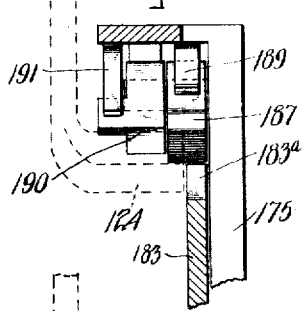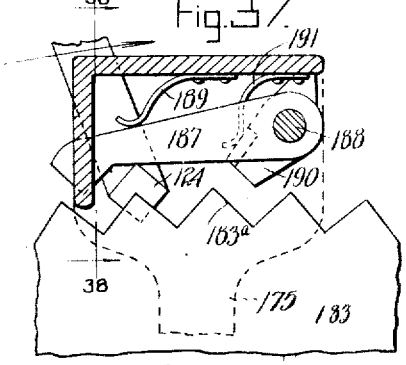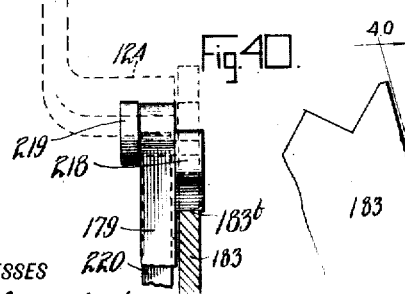

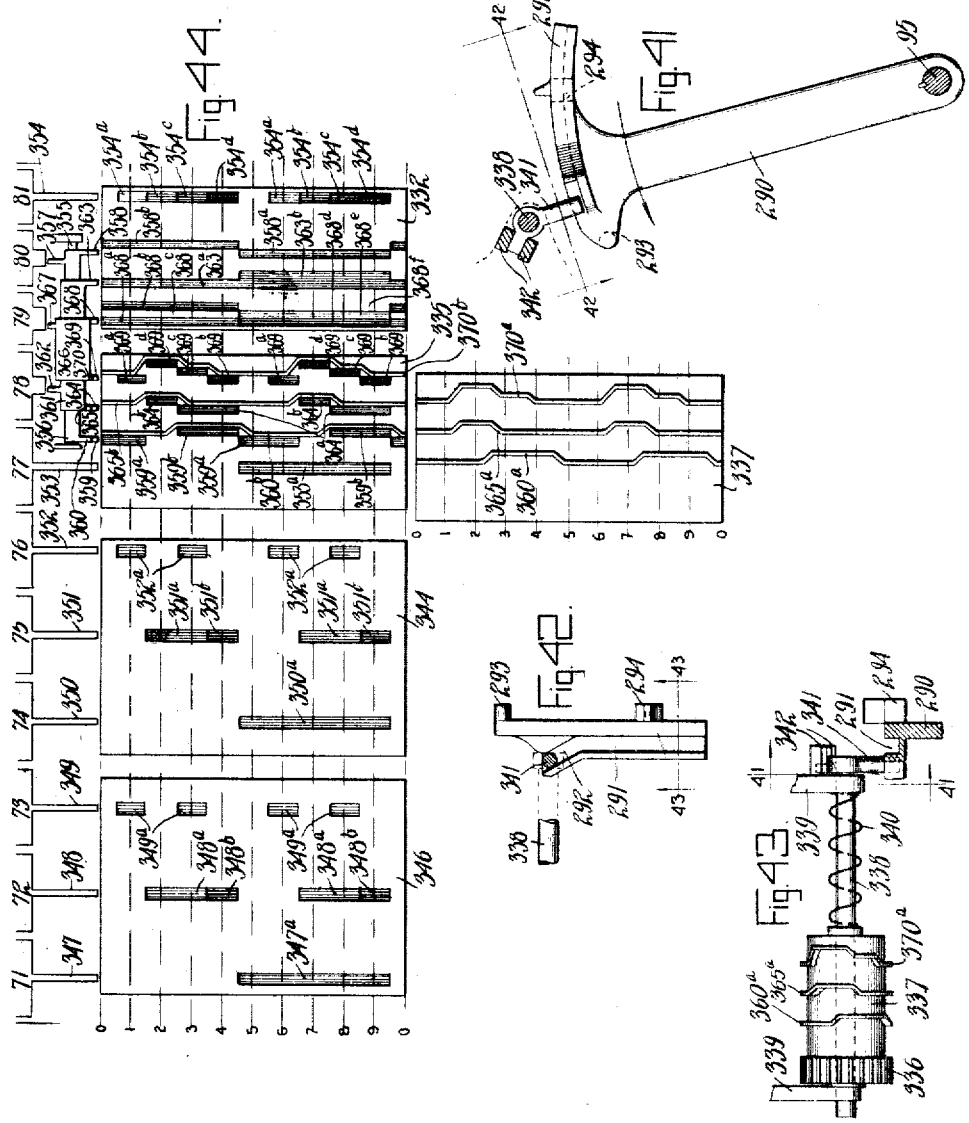

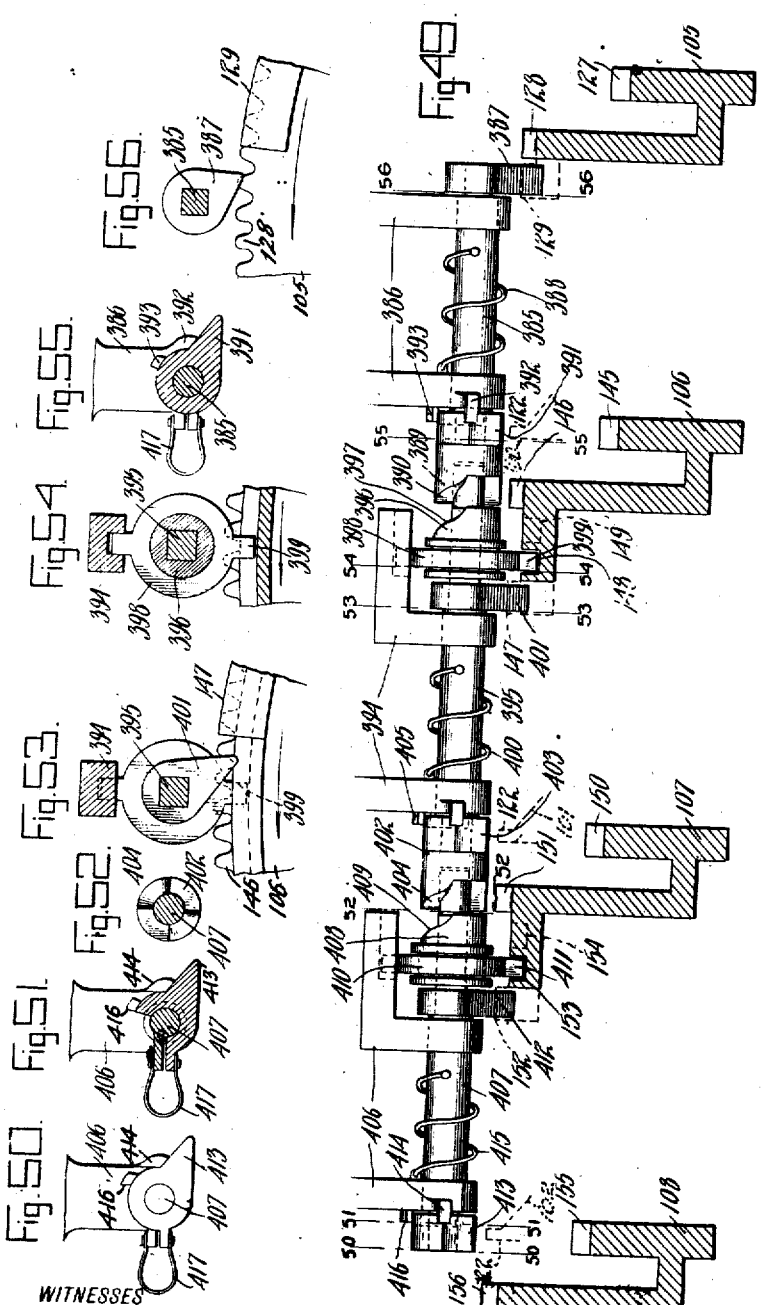

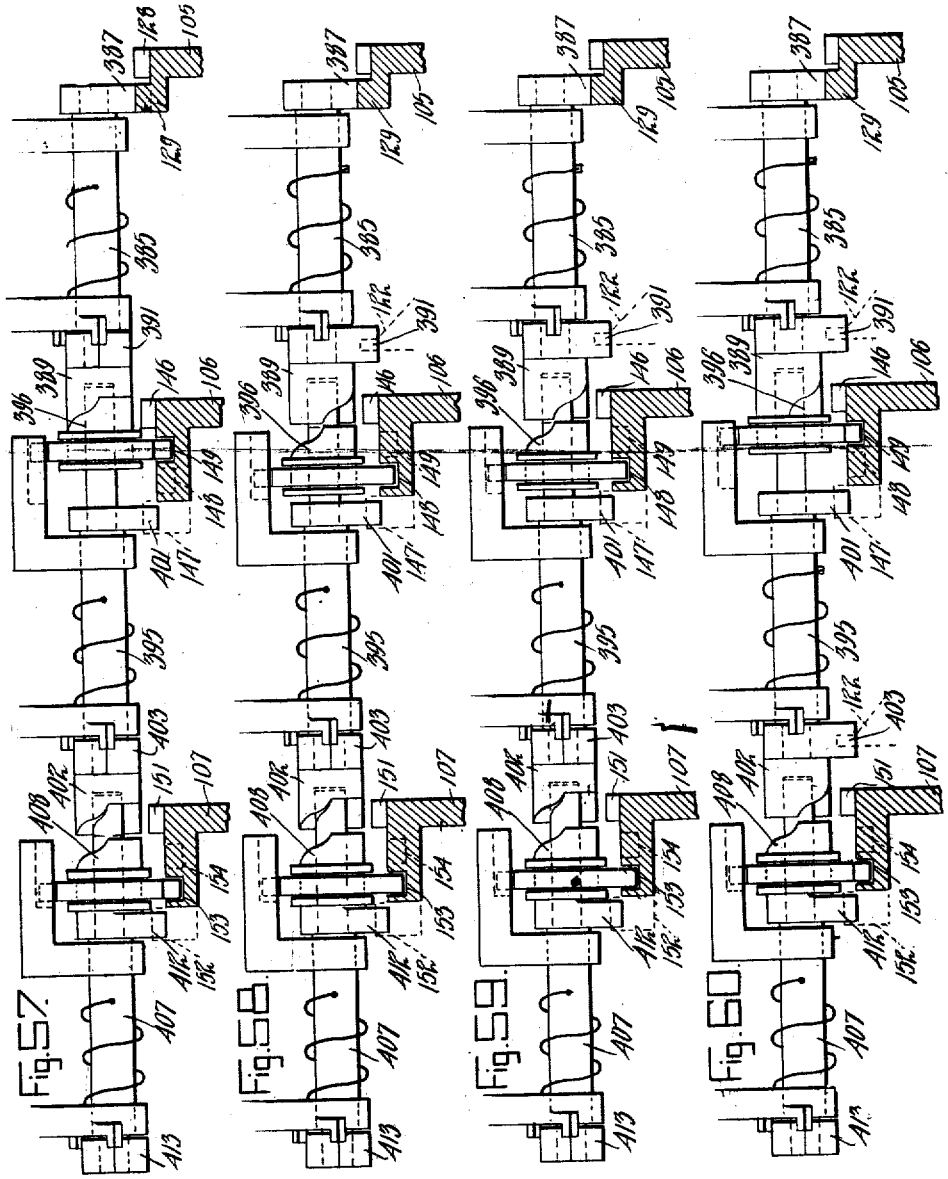

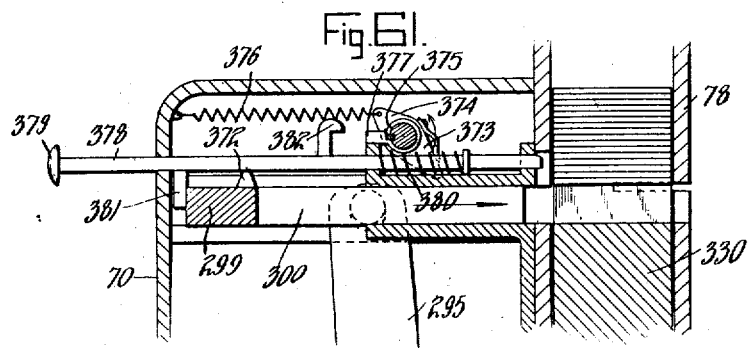
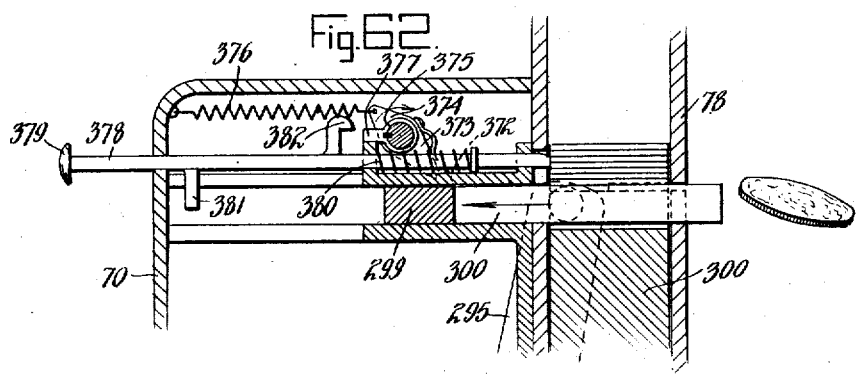
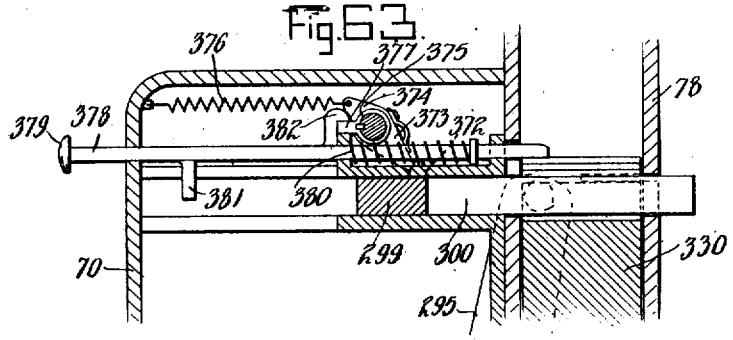

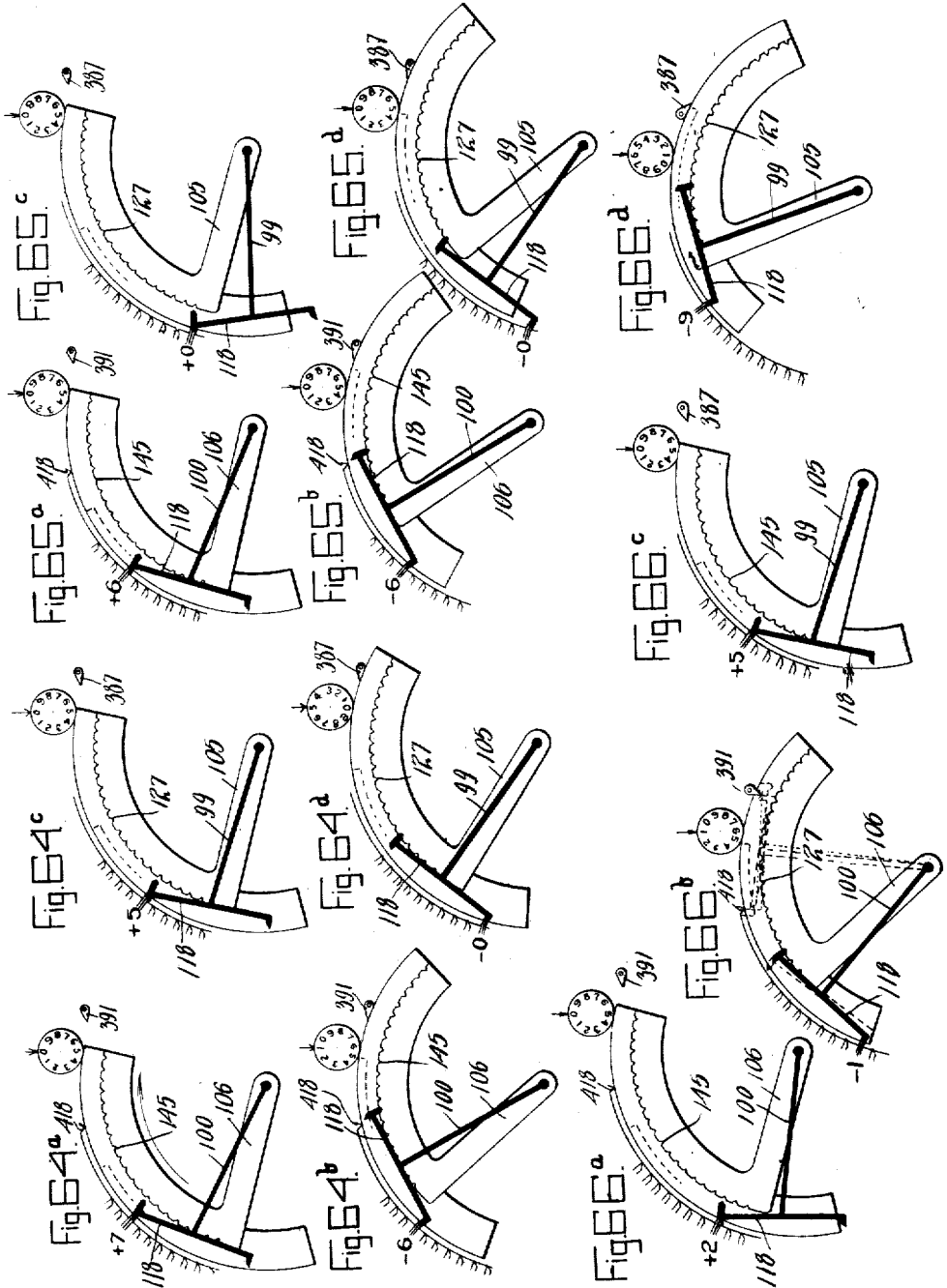

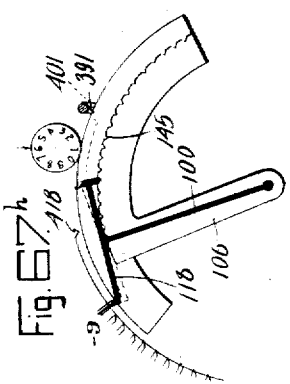
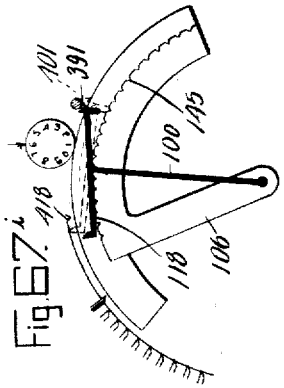
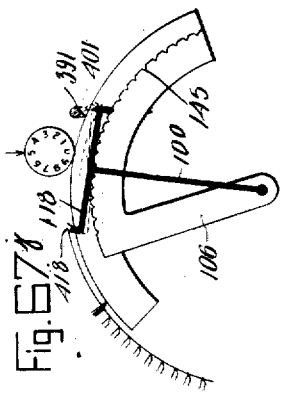
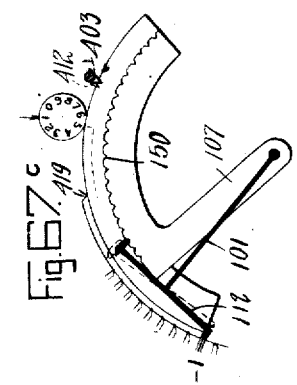
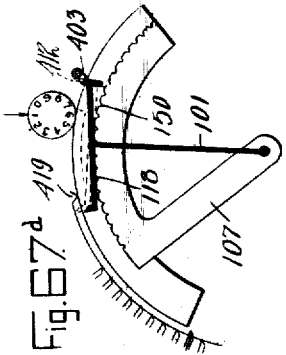
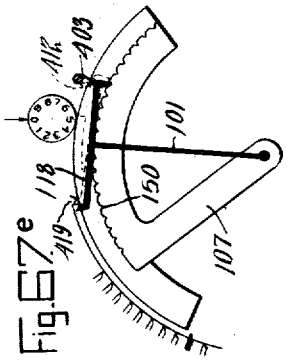

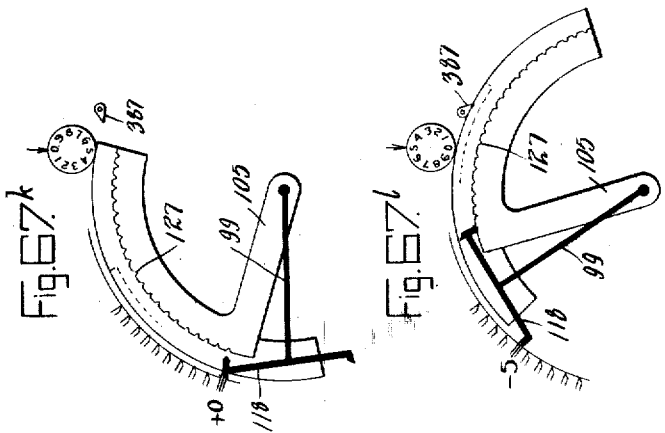
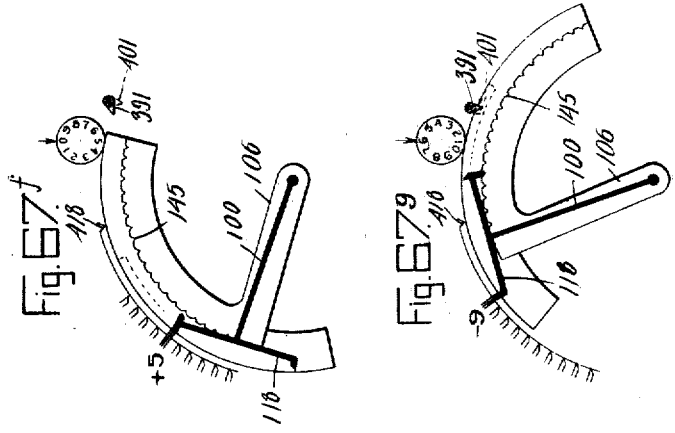
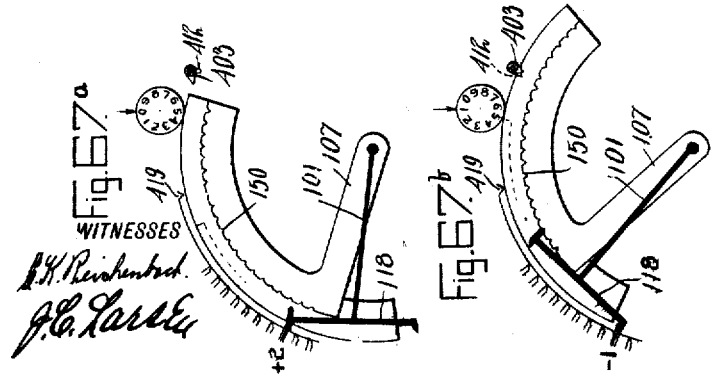

UNITED STATES PATENT OFFICE.

JAMES R. COMBS, OF NEW YORK, N. Y.

CHANGE-MAKING MACHINE.

1,272,224.　　　　Specification of Letters Patent.　　Patented July 9, 1918.

Application filed May 4, 1916.　Serial No. 95,440.

*To all whom it may concern:*

Be it known that I, JAMES R. COMBS, a citizen of the United States, and a resident of the city of New York, borough of Manhattan, in the county and State of New York, have invented certain new and useful Improvements in Change-Making Machines, of which the following is a specification.

This invention relates to change making machines wherein the amount of money tendered, the amount of the purchase, and the amount of change due, are indicated, and which delivers the exact change in the fewest denominational units.

One of the main objects is to provide means for the delivery of the monetary notes, as well as the coins, at a common delivery point, instead of only the coins as in machines of this class now known to me.

A further object is to provide means for segregating the several notes in each of a plurality of stacks of different denominations, whereby the possibility of delivering more than a required number of notes from a stack is prevented.

A further object is to provide a structure wherein there is no possibility of related parts being carried out of original relationship, as by a sudden or jerky manipulation by a careless or hasty operator, a fault in some machines now known to me.

A further object is to provide means whereby the actuation of the computing elements is in the same direction for the plus and minus calculations, thereby overcoming a common fault of moving such elements in one direction for one calculation and in a reversed direction for the other calculation, this double movement requiring that certain parts shall be engaged for the first calculation, released, and again engaged for the second calculation, thereby presenting opportunities for derangement of the parts while in the released condition.

A further object is to provide a multiple ejector as a unit whereby any possibility of non-ejection for one or more of the stacks is prevented.

A further object is to provide a lock common to all the note and coin stacks and which lock is not released until the selectively adjusted elements are in definite positions, and, in this connection, a still further object is to give notice of the close approach to an empty condition of any of the note or coin stacks, such notice being preferably given before the stack is entirely empty.

One of the principles upon which my machine is based is the intercepting of manually movable elements by depressed ones of a plurality of manipulative keys the depression of which, however, does not actuate any of the movable elements and, in conjunction therewith, I employ certain selective parts shown and described in United States Letters Patent, 1,218,376, granted to me on the 6th day of March, 1917.

My invention is fully described in the following specification, of which the accompanying drawings form a part, in which like characters refer to like parts in each of the views, and in which:—

Fig. 3 is an enlarged fragmentary view to clearly illustrate the arrangement of the selective keys;

Fig. 4 is a section taken on the line 4—4 of Fig. 3;

Fig. 4ª is a fragmentary view of a detail shown in Fig. 4, partly in section;

Fig. 5 is a detached view of a detail shown in Fig. 4;

Figs. 6 and 6ª jointly comprise a section taken on the line 6—6 of Fig. 4; with certain parts out of normal positions to show their structure;

Figure 24:
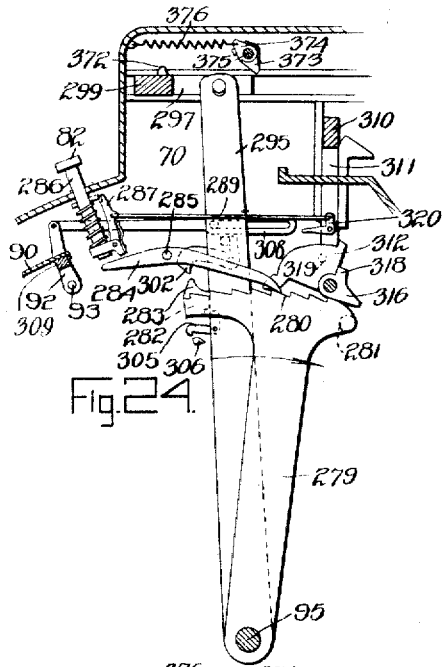
Figure 25:
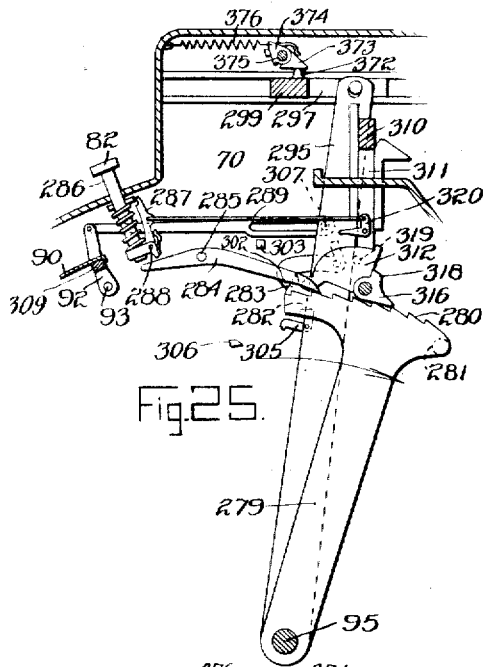
Figure 26:
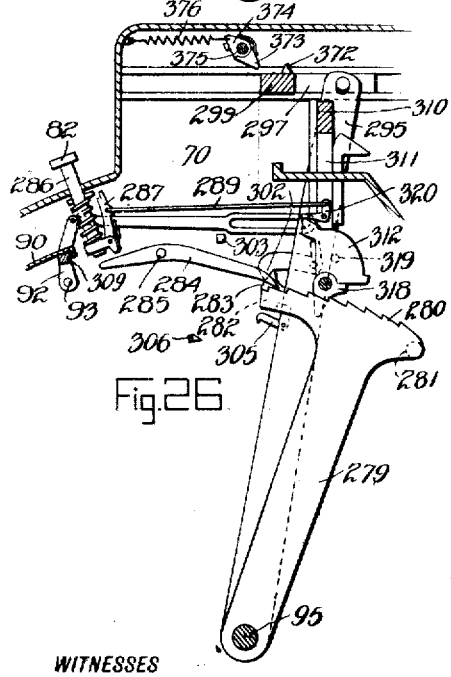
Figure 27:
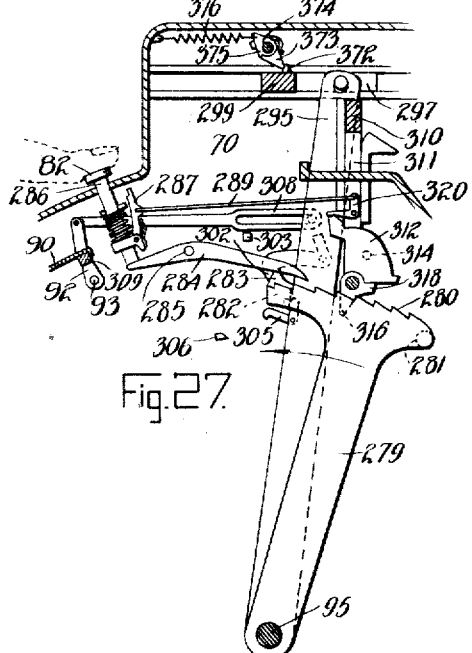

Fig. 7 is a fragmentary section taken on the line 7—7 of Fig. 4, as well as on the line 7ª—7ª of said figure, the structure being alike upon each line;

Fig. 8 is a similar section taken on the line 8—8 of Fig. 4;

Fig. 8ª is a fragmentary view of Fig. 8, from the right hand side, to show a dial counter or totalizer;

Fig. 9 is a section taken on the line 9—9 of Fig. 8;

Fig. 9ª is a plan view of Fig. 9;

Fig. 10 is a section taken on the line 10—10 of Fig. 8;

Fig. 11 is a section taken on the line 11—11 of Fig. 9;

Fig. 12 (Sheet 13) is a sectional plan view of the stack and ejector arrangement, on the line 12—12 of Fig. 4;

Fig. 13 (Sheet 13) is a detached view of a monetary note case which I employ;

Fig. 14 is a fragmentary side view, enlarged, of a pawl arm shown in Fig. 4, in normal position;

Fig. 15 is a top or end view thereof;

Fig. 16 is a section taken on the line 16—16 of Fig. 14;

Figs. 17, 18, and 19, are fragmentary views of Fig. 14, showing pawl movement from the normal position to an alternate position;

Figs. 20 and 21 are views similar to Fig. 14 showing the pawl being returned to normal position;

Fig. 22 is an enlarged section, taken on the line 22—22 of Fig. 6;

Fig. 23 is a section taken on the line 23—23 of Fig. 22;

Fig. 24 is a reduced view similar to Fig. 22, showing forward movement of the parts in a certain degree, as to the line 24 of Fig. 22;

Fig. 25 shows a further movement to the line 25 of Fig. 22;

Fig. 26 shows a further movement to the line 26 of Fig. 22, this being the forward limit;

Fig. 27 shows the manner of releasing the parts shown in Fig. 22 from their extreme forward position for return to normal position;

Fig. 28 is a side view of a computing arm shown in Figs. 6 and 6ª, jointly constituting one figure; the "cents" arm;

Fig. 29 is an upper edge view of Fig. 28;

Fig. 30 is a side view of another computing arm, the "dimes" arm;

Fig. 31 is a top edge view of Fig. 30;

Fig. 32 is a side view of another computing arm, the "dollar" arm;

Fig. 33 is a top edge view thereof;

Fig. 34 is a side view of still another computing arm, the "tens" arm;

Fig. 35 is a top edge view thereof;

Fig. 36 is a fragmentary section, as on the line 36—36 of Fig. 6ª, showing a plus register arm, a minus register arm, locking means therefor, and the manner of release thereof;

Fig. 37 is an enlarged fragmentary view of Fig. 36, with the parts in the same positions;

Fig. 38 is a section taken on the line 38—38 of Fig. 37;

Fig. 39 is an enlarged fragmentary view of another part of Fig. 36, with the parts in the same relative positions;

Fig. 40 is a section thereof on the line 40—40;

Fig. 41 is a side view, reduced, of an operating arm forming a part of the change selection mechanism;

Fig. 42 is a section taken on the line 42—42 of Fig. 41;

Fig. 43 is a plan view of Fig. 42, also a view at right angle to Fig. 41, and showing a guide cylinder and its manner of longitudinal movement by means of the arm shown in Figs. 41 and 42;

Fig. 44 is a development of the change selection drums shown in Figs. 6, 6ª, and 43;

Fig. 45 is a vertical section taken through the "cents" stack, with the parts in normal position;

Fig. 46 is a similar view showing the parts set for the delivery of two cents;

Fig. 47 is a similar view showing the process of the ejection of two cents from the stack;

Fig. 48 is a section taken on the line 48—48 of Fig. 45;

Fig. 49 is a view of what I term the "transfer", as in "borrowing" from another digit column, and also showing the relationship therewith of the several computing arms and the cams shown in Figs. 31 and 33;

Fig. 50 is an end view taken on the line 50—50 of Fig. 49;

Fig. 51 is a section taken on the line 51—51 of Fig. 49;

Fig. 52 is a section taken on the line 52—52 of Fig. 49;

Fig. 53 is a section taken on the line 53—53 of Fig. 49;

Fig. 54 is a section taken on the line 54—54 of Fig. 49;

Fig. 55 is a section taken on the line 55—55 of Fig. 49;

Fig. 56 is a section taken on the line 56—56 of Fig. 49;

Fig. 57 is a view similar to Fig. 49 but showing the parts in a definite relationship for one calculation;

Fig. 58 is a similar view with the parts in position for another calculation;

Figs. 59 and 60 jointly show steps in another calculation;

Fig. 61 is an enlarged section, fragmentarily, taken on the line 61—61 of Fig. 3, and showing the "low change" safety mechanism, in normal position;

Fig. 62 is a similar view showing a coin ejection, the coins in the stack approaching the danger level;

Fig. 63 is a similar view showing the parts in warning position, though still permitting coin ejection;

Figs. 64ª, 64ᵇ, 64ᶜ and 64ᵈ are diagrammatic views of one calculation, showing the relative positions of the respective computing arms and pawl arms;

Figs. 65ª, 65ᵇ, 65ᶜ and 65ᵈ are similar views of another calculation;

Figs. 66ª, 66ᵇ, 66ᶜ and 66ᵈ are similar views of another calculation; and

Figs. 67ª, 67ᵇ, 67ᶜ, 67ᵈ, 67ᵉ, 67ᶠ, 67ᵍ, 67ʰ, 67ⁱ, 67ʲ, 67ᵏ and 67ˡ are similar views of a three digit calculation.

Referring to the drawings, 70 represents a shell or housing for the operative parts of the machine, said shell carrying a casing at its top divided into compartments or stacks 71, 72, 73, 74, 75, 76, 77, 78, 79, 80 and 81, being the "$50.00", "$20.00", "$10.00", "$5.00", "$2.00", "$1.00", "$.50", "$.25", "$.10", "$.05", and "$.01", stacks, respectively, Fig. 12, and each of these stacks is provided with a "low change" mechanism including a plunger button at the front of the shell 70, as indicated by the denominational characters in Fig. 3, the front of said shell also carrying a "re-set" button 82 to be described.

The shell 70 also carries a plurality of radially arranged plungers arranged in pairs of vertical banks for each digit within the capacity of the machine, shown for four digits, each pair comprising a plus bank, and a minus bank, the plungers carrying buttons bearing the numerals from 0 to 9 from the bottom to the top of each bank, the keys formed by the respective plungers and buttons being designated 83 and 83ª for the plus and minus banks in the "cents" position, 84 and 84ª for the plus and minus banks in the "dimes" position, 85 and 85ª for the plus and minus banks in the "dollars" position, and 86 and 86ª for the plus and minus banks in the "tens of dollars" position, respectively.

As shown in Fig. 4, these keys are guided in a fixed arcuate plate 87 within the shell 70 and are held in outermost positions by means of springs 88 when permitted to move to such positions. Each key has its inner end beveled and is provided with a tooth 89 inclined on its inner side, all of said teeth being movable in a segmental plate 90 having slots 91 for the respective teeth to pass through, this plate 90 being supported at its forward or upper end by a rocking lever 92 pivoted at 93 and being slidably supported at its lower end between pins or rollers carried by the shell 70 and being normally held in lowermost position by means of a spring 94. When a key is depressed in any bank, the particular plate 90 of that bank is moved upwardly to engage the tooth on the key and thus prevent the rising of the latter into normal position until the respective plate 90 has been moved upwardly, either by the depression of another key in the respective bank, or by means to be later explained, it being understood that there is an independently movable plate 90 for each bank.

Figure 1:
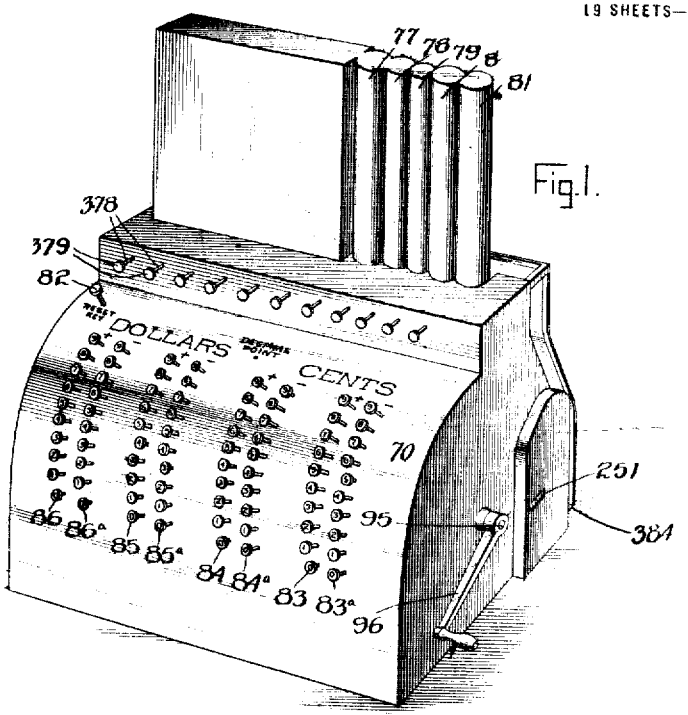
Figure 1 is a perspective front view of one embodiment of my invention, with the keys set for a certain calculation and change delivery.
Figure 2:
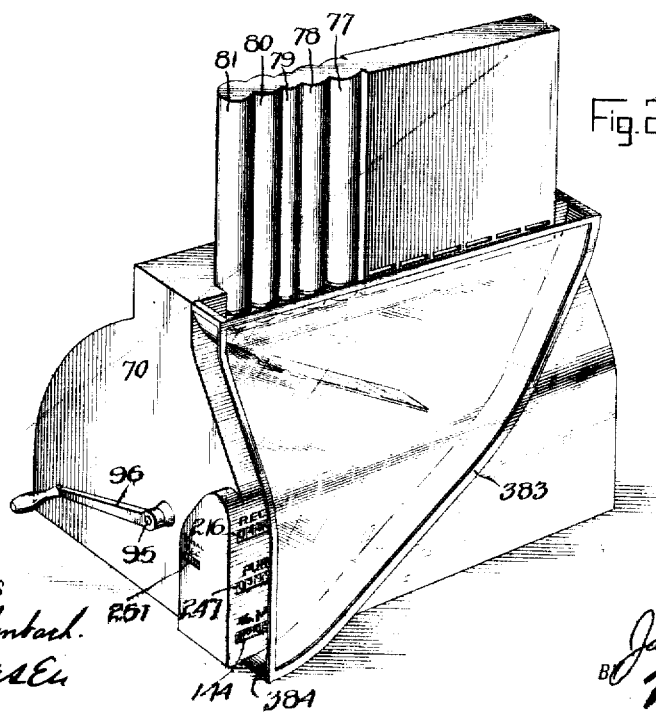
Fig. 2 is a rear perspective view thereof.

Arranged longitudinally of and within the shell 70 is a main shaft 95 rotatable by means of a crank handle 96 exteriorly of the said shell from front to rear in operating direction movement of said handle, said shaft carrying an arm 97 connected with the bottom of the shell 70 by means of a spring 98 whereby said crank handle is normally held in or has a tendency to return to the initial position shown in Figs. 1 and 2, thereby rotating the main shaft 95 in like manner.

Keyed to the shaft 95 are four pawl arms 99, 100, 101, and 102, one for each pair of banks of keys and arranged in a plane between the banks of the respective pair, the outermost end of each pawl arm traversing an arc of a circle but slightly less in radius than the radius of the arcuate plate 87 and each pawl arm carries a supplemental arm 103 provided with a beveled offset 104, Figs. 4, 6, 6ª and 36, for a reason to be explained.

Adjacent the planes of movement of the pawl arms are computing arms 105, 106, 107 and 108, freely rotatable on the main shaft 95, and adapted to be locked to the respective pawl arms at certain times for certain distances of movement therewith, and arranged adjacent the said computing arms are saw-tooth segments 109, 110, 111 and 112, respectively, fixed to the bottom of the shell 70, and concentric with the shaft 95, each computing arm being adapted to be locked to the respective segment, as will be later explained.

All the pawl arms are alike and a description of one will suffice, as are also all the segments above described, whereas the computing arms differ only in one member thereof. Each pawl arm is provided with an angular extension 113 having two notches, 114 and 115, on the inner side thereof for alternate engagement with a nosing 116 carried by a rod 117 slidable longitudinally in a rocking frame 118 pivoted centrally to the pawl arm at 119, said rod being held in such engaged position by means of a spring 120. The forward end of the rod 117 carries an offset 121 extending into the plane of the plus keys of the respective digit and adapted to be engaged by the beveled end of a depressed plus key to withdraw the nosing 116 from the extension 113, or notch 114 thereof, and the frame 118 carries a beveled offset 122 also adapted to be engaged by a depressed plus key to force the nosing 116 toward and into engagement with the notch 115, this being clearly shown in Figs. 14, 15, 16, 17, 18 and 19, the frame 118 thus having been rocked on its pivot.

The frame 118 carries a tooth 123 on its under side which is adapted to engage with a member of the respective computing arm in a manner to be soon explained, and said frame also carries a horizontally arranged finger 124, Figs. 14, 15 and 16, for a purpose to be later explained.

The rearward end of the rod 117 is angular in cross section to prevent its rotation in the frame 118 and is provided with an offset 125 directed to the side of the frame opposite to the offset 121, and said frame also carries an offset 126 at its rear end. These last named offsets are in the plane of the minus keys of the respective digit and are adapted to be engaged by a depressed one of said minus keys if the frame 118 has been rocked in the manner above described, such depressed minus key first retracting the rod 117 out of the notch 115 and then, because of the bevel of the key and of the offset 126, said frame is again rocked to initial or normal position and, when the offset 125 is released from the key in the forward swing of the pawl arm, the nosing 116 again enters the notch 114 and raises the tooth 123 and the finger 124 from the path of travel previously occupied thereby.

This pawl arm construction with its rocking frame and tooth 123 and finger 124 constitute a highly important part of my invention, as it is this rocking movement of the frame 118 which makes the calculations, but it will be noted that the frame 118 is positively locked against rocking in an accidental manner in both of its positions.

The computing arm 105, adjacent the pawl arm 99, Figs. 4 and 6ª, comprises what I will term a ratchet arcuate member 127 concentric with the shaft 95 arranged immediately adjacent the said pawl arm and of relatively short radius, a toothed arcuate member 128 of greater diameter than the member 127 and also concentric with the shaft 95 though in a different plane than the member 127, Fig. 6ª, and a smooth edged arcuate member 129 of less length than the member 128 though of a radius equaling that of the ends of the teeth on the member 128, but in a different plane than either of the members 127 or 128, Figs. 6ª, 28, and 29, the plane of the member 127 being that of the tooth 123 on the rocking frame 118 whereby depression of the forward end of said frame will cause said tooth to engage the ratchet member 127 and cause the computing arm 105 to move with the pawl arm 99.

The computing arm 105 is normally locked to the saw-tooth sector 109, Fig. 4, by means of a pawl 130 pivoted to the member 127 at 131 and provided with an arm 132 on the side of the member 127 toward the pawl arm 99, said pawl arm carrying a projection 133, Fig. 4ª, adapted to engage said arm 132 in the downward movement of the pawl arm to disengage the pawl 130 from the sector 109, and the member 127 carries a stop 134 against which the projection 133 impinges in the downward pawl arm movement to carry the computing arm 105 with the pawl arm.

The pawl 130 is also provided with another arm 135 in pivotal connection with the arcuate plate 136 the other end of which, Fig. 4, is in pivotal connection with a link 137 pivoted to the member 127, the outer edge of the plate 136 normally resting adjacent the member 127 at the outer ends of the teeth on said member and being maintained there, yieldingly, by means of a spring 138. The object of this construction is to insure unlocking of the pawl 130 from the fixed sector 109 when the tooth 123 of the rocking frame 118 is depressed to engage the member 127 of the computing arm 105, inasmuch as the plate 136 must be depressed to permit this tooth 123 and member 127 engagement, and the pawl 130 is thereby raised.

The computing arm 105 also carries a toothed segment or sector 139 which is in constant engagement with a double pinion 140 freely rotatable on a sleeve 141 itself rotatably held in the shell 70, the pinion 140 being enmeshed with a pinion 142, Fig. 7, connected with a display wheel 143 bearing numerals on its periphery visible at a window 144 in the rear of the shell, Fig. 2, this display wheel being one of a plurality of similar wheels later referred to and which collectively form the "change" counter.

The computing arm 106, adjacent the pawl arm 100, Fig. 6ª, comprises a ratchet member 145, a toothed arcuate member 146 and a smooth arcuate member 147 similar to the members 127, 128 and 129 of the arm 105 already described, the computing arm 106 being normally locked to the saw-tooth sector 110, and said arm is also provided with a peripheral groove consisting of two parts, 148 and 149, in different planes though joined together.

The computing arm 107, adjacent the pawl arm 101, Fig. 6, is exactly the same as the arm 106, Figs. 32 and 33, comprising a ratchet member 150 adapted to be locked to the saw-tooth sector 111, a toothed arcuate member 151, a smooth arcuate member 152, and a peripheral groove formed of two joined portions 153 and 154.

The computing arm 108, Figs. 6, 34 and 35, adjacent the pawl arm 102, comprises only the ratchet member 155 adapted to be locked to the saw-tooth sector 112 and the toothed arcuate member 156. In this connection attention is drawn to the fact that Figs. 6 and 6ª are largely diagrammatic in that the pawl arms and computing arms, as well as other parts to be described, are in vertical positions merely for purposes of illustration to show their relative positions.

The computing arms 106, 107 and 108 are provided with toothed sectors 157, 158 and 159, similar to the sector 139 of the computing arm 105, as shown in Fig. 7, these being enmeshed with pinions 160, 161 and 162 keyed to nested shafts 163, 164 and 165 in turn carrying pinions 166, 167 and 168 enmeshed with pinions 169, 170 and 171 on display wheels 172, 173 and 174, respectively, these wheels being visible at the window 144, the actuation of any of the computing arms in any degree being shown by the respective display wheels, and these display wheels return to zero when the respective computing arms return to normal positions.

The shaft 95 also carries, loosely, four plus register arms 175, 176, 177 and 178, and four minus register arms 179, 180, 181 and 182, arranged in juxtaposition to and upon opposite sides of stepped saw-tooth sectors 183, 184, 185 and 186, respectively, fixed to the floor of the shell 70 and the relative positions of which are shown in Figs. 6 and 6ª. By reference to Figs. 36 to 40, inclusive, it will be noted that the horizontal fingers 124 of all the pawl arms 99, 100, 101 and 102 almost touch the respective toothed stepped sectors 183, 184, 185 and 186, and normally in line with the tops of the saw-teeth on the arc of greater radius of each sector.

A description of one of the plus register arms and of one of the minus register arms will suffice as they are all alike in construction and operation. Referring to Figs. 36 to 40, inclusive, it will be seen that the plus register arm 175 carries a pawl 187 pivoted at 188 and adapted to be engaged with the teeth 183ª of longer radius of the sector 183 by means of a spring 189, said pawl 187 being of a greater width than the thickness of the stepped sector 183 whereby the finger 124 of the pawl arm 99 may normally engage and hold the pawl 187 in raised position, and said pivot 188 also carries a loose stop 190 normally held in the path of movement of the finger 124 by means of a spring 191 and capable of upward movement only. As the pawl arm 99 moves forward, in the normal position of the finger 124, said finger impinges on the stop 190 and forces the plus register arm 175 along with it until the finger 124 drops below the stop 190 by the rocking of the frame 118, already described, by means of a depressed key in the corresponding plus bank of keys. Upon such dropping of the finger 124 the pawl 187 is forced into engagement with the portion 183ª of the stepped sector 183 to lock the plus register arm 175 thereto. When the pawl arm 99 returns to normal position the finger 124 raises and passes the stop 190 and also raises the pawl 187 out of engagement with the stepped sector 183 and upon striking the angular end of the pawl 187 said finger 124 carries the plus register arm 175 to normal position, the frame 118 of the pawl arms being always in normal positions upon backward pawl arm movement for a reason later explained.

The plus register arms carry toothed sectors 192, 193, 194 and 195, as shown in Fig. 7, and also in Fig. 36, enmeshed with pinions 196, 197, 198 and 199 on nested shafts 200, 201, 202 and 203 carrying pinions 204, 205, 206 and 207 enmeshed with pinions 208, 209, 210, 211, respectively, on display wheels 212, 213, 214 and 215, visible at a "received" window 216.

The minus register arm 179 carries a rotatable pin 217, Fig. 36, and Fig. 39, to one end of which is secured a pawl 218 in normal engagement with the teeth of the short radius portion 183ᵇ of the stepped sector 183 and to the other end of the pin 217 is secured another member or arm 219 having a bar 220 pivoted thereto and slidably guided on the arm 179, the lower end of this bar having an inclined lug 221 thereon in the path of movement of the beveled offset 104 on the supplemental arm 103 of the pawl arm, a spring 222 maintaining these parts in position though yieldingly.

The finger 124 of the pawl arm 99 when in normal position passes over the end of the minus register arm 179, as indicated in Fig. 36, but if said finger is in depressed position, because of the downward rocking of the frame 118 of the pawl arm by a plus key in depressed position, said finger 124 impinges on the rear upper corner of the arm 219 and raises the pawl 218 from the stepped sector 183, against the action of the spring 222, and said finger 124 then strikes against the outer end of the minus register arm and carries it along until the pawl arm finger 124 again rises, in a manner to be explained, whereupon the pawl 218 again engages the stepped sector 183. Upon the return of the pawl arm to normal position, after a machine operation, the offset 104 strikes against the lug 221, draws the bar 220 downwardly, raises the pawl 218 out of stepped sector engagement, and carries the minus register arm rearwardly to initial position. In this connection it might be stated that the portion 183ª of the stepped sector, of the larger radius, has ten spaces between teeth for the reception of the pawl 187 as has also the portion 183ᵇ of the shorter radius for the reception of the pawl 218, for the reason that the calculations of the form of machine shown are based upon the decimal system, for United States money.

The minus register arms carry toothed sectors 223, 224, 225, and 226, Figs. 8 and 36, enmeshed with pinions 227, 228, 229, and 230 on nested shafts 231, 232, 233 and 234, also carrying pinions 235, 236, 237, and 238, enmeshed with pinions 239, 240, 241, and 242, on display wheels 243, 244, 245, and 246, respectively, visible at a window 247 in the rear of the shell 70, these wheels collectively forming the "purchase" counter.

The pinion 235 is also enmeshed with a pinion 248 on a shaft 249 and freely rotatable thereon, the outer end of said shaft carrying a dial disk 250 revealing one number thereon at a window 251 in the side of the shell 70, Figs. 1, 2, and 8ª, forming a part of the totalizer of the day's sales, the pinion 248 carrying a spring pawl 252 engaging a ratchet 253 slidably keyed on the shaft 249 and provided with a radial pin 254 at one side thereof adapted, in a full revolution of the ratchet 253, to strike against a beveled stop 255 on a stationary support 256 for the totalizer, thereby sliding the ratchet 253 outwardly until the said pin, in the further revolution of the ratchet to complete its revolution, strikes against another beveled stop 257 which slides the ratchet rearwardly into initial position.

The pinion 236 is also enmeshed with a pinion 258 rotatable on the nested shaft 249 and provided with a spring pawl 260 engaged with a ratchet 261 slidably keyed on a shaft 259 and provided with a pin 262 adapted to engage stops similar to the stops 255 and 257 to move said ratchet 261 forwardly and rearwardly as in the case of the ratchet 253, and the shaft 259 carries a dial disk 263 also revealing one number thereon at the window 251. The pinion 258 also carries a hub 264 provided with two oppositely arranged spiral grooves 265 in which two inwardly directed lugs 266 on a ring 267 are movable, the forward movement of the ratchet 253 by means of the cam 255 forcing said ring forwardly on the hub 264 and, because of the grooves 265, said ring is rotated one degree of the ten degrees which constitute a complete revolution, this degree of movement being imparted to the ratchet 261 by means of a spring finger 268 carried by said ring and engaged with said ratchet 261 and passed through a suitable slot in the pinion 258, thus advancing the dial 263 one degree beyond its previous relationship with the pinion 258.

The pinion 237 is also enmeshed with a pinion 269 rotatable on a nested shaft 270 carrying a dial disk 271 also readable at the window 251, this pinion 269 being also provided with a slidable ratchet, the slidable ring, and the spring finger described with reference to the pinion 258, whereby the slidable ratchet of the pinion 269 may also be advanced one degree, as well as its dial disk 271.

The pinion 238 is also enmeshed with a pinion 272 rotatable on a nested shaft 273 carrying a dial disk 274 also readable at the window 251, this pinion 272 being provided with a ratchet 275 not slidably mounted though rotatable by means of the sliding ring and spring finger of this pinion 272 in order to advance the dial 274 one degree over its previous relationship with the pinion 272.

The dial disk 274 carries a pin 276 on its rearward face adapted to engage each tooth successively of a plurality of teeth, ten in number, upon a disk 277 also readable at the window 251. All of the ratchets are prevented from backward rotation by means of a fixed spring pawl 278, Fig. 10, but the four pinions of the totalizer may revolve backwardly because of the spring pawls thereon engaged with the respective ratchets.

As one of the minus register arms is carried forwardly by the respective pawl arm the corresponding totalizer pinion is revolved accordingly to indicate the degree of revolution, or the number of spaces moved by the minus register arm, at the window 251. When ten degrees have been so indicated the respective ratchet is actuated one degree forwardly by the forward actuation of the respective ring, in other words, the units ratchet will actuate the tens dial one degree forward, the tens ratchet will actuate the hundreds dial forward one degree, and the hundreds ratchet will actuate the thousands dial forward one degree, upon the completion of a revolution by each of said registers. As will be understood, the several totalizer pinions are carried to initial positions upon the return of the respective minus register arms to initial positions when the machine has completed an operation.

At the left hand side of Fig. 6 and in Figs. 22 to 27, inclusive, I have shown a lock arm 279 keyed to the main shaft 95 and provided with teeth 280 on its outer end, with a pin 281 at its forward extension, with a lug 282 having an extension 282ª thereon, and with a raised member 283, said teeth being engaged by a pawl 284 pivoted at 285 and the rear end of which is beneath a rod 286 of the "re-set" button 82, the depression of this key upsetting the pawl 284 to release the lock arm 279 to permit its return to initial position, this being prevented at times because of a spring actuated latch 287 pivoted at 288 adapted to be retracted by means of a rod 289.

At the opposite end of the main shaft 95 is keyed a setting arm 290, Figs. 41 to 43, which is provided with a peripheral groove 291 terminating with an inclined groove 292 at its forward end, this arm having a pin 293 thereon, having a lug 294 provided with an extension 294ª, and having a raised member similar to the member 283 of the arm 279, the arms 279 and 290 being in the same relative positions with respect to the main shaft 95 and being movable simultaneously therewith; certain of the functions of the lock and setting arms 279 and 290 being the same at opposite ends of the main shaft 95.

Freely rotatable at the ends of the main shaft 95 are ejector arms 295 and 296, Figs. 6, 6ª, 4, 22, 23, 24, 25, 26, and 27, joined at their upper ends by means of pivot pins to slide bars 297 and 298 guided in grooves in the shell 70 and joined together at their rear ends by means of an ejector bar 299 having an ejector finger thereon for each of the stacks.

Each ejector arm carries a pivot 301 for a latch 302 having a downwardly directed member for engagement with the raised members of the lock and setting arms, respectively, as shown in Figs. 25 to 27, thus locking the ejector arms to the lock and setting arms under the following conditions. The latches 302 are normally held out of operative positions by means of fixed stops 303, one being shown in Figs. 22 and 23, and have, each, an upwardly directed arm 304 adapted to bear against the respective stop 303 when the ejector arms are in their normal positions. In the forward movement of the lock and setting arms the lugs 282 and 294 thereon strike against the respective ejector arms and move the same forwardly to permit the latches 302 to drop into engagement with the lock and setting arms. The ejector arms are normally locked in rearward positions by means of bell-cranks 305, Figs. 22 and 23, pivoted thereto and in normal engagement with a beveled projection 306 at each end of the shell 70, the upper ends of these bell-cranks 305 being in the path of forward movement of the lug extensions 282ª and 294ª of the lock and setting arms, whereby said bell-cranks 305 must first be released by the lock and setting arms before the ejector arms may move forwardly in the forward movement of the latter but, as will be seen by the initial positions of the parts in Fig. 22, the lock and setting arms must travel through a considerable degree of their full movements before this ejector arm release occurs.

The ejector arms also carry pins 307 engaged within an elongated slot in a link 308 at each side of the machine, only one being shown, and these links are in pivotal connection with the rocking levers 92 and the connecting bar 309 of which rocking levers support the upper ends of all of the key locking plates 90, although the plate 90 of each bank of keys is independently movable upwardly by the depression of a key in the corresponding bank of keys. When the ejector arms have moved forwardly to nearly their full throw, to eject the money from the respective stacks, the levers 92 are rocked and all of the key locking plates 90 are drawn upwardly sufficiently far to release all depressed keys and permit their return to normal positions.

Each stack is slotted from front to rear to permit the passage of the respective ejector fingers, and slotted from side to side for a lock bar 310 passed through all of the stacks, as shown in Fig. 48, the ends of said lock bar being carried by vertically movable bars 311 supported on cam edged dogs 312 pivoted to a fixed part 313, Fig. 23, of the shell 70, stops 314 and 315 being provided to limit the movement of said dogs on their pivots. When the dogs 312 are in their normal positions, shown in Figs. 22, 26 and 27, the lock bar 310 is held in its uppermost position, but when said dogs are rocked into the position shown in Figs. 24 and 25 the lock bar may move downwardly a distance equal to the difference in radii of the cam edge of the dogs.

Each dog 312 has a lever 316 in pivotal connection therewith normally held in a definite relative position by means of a spring 317 and stop 318, but movement is permitted in one direction because of said spring, and these levers are normally in the path of movement of the pins 281 and 293 of the lock and setting arms whereby the dogs 312 are tripped in the forward movement of these lock and setting arms to permit the lock bar 310 to drop. Continued forward movement of these last named arms carries the ejector arms forwardly until the forward edges thereof impinge on pins 319 carried by the dogs and return the dogs to normal positions, as well as the lock bar 310, this occurring after coin ejection and just as the parts have about completed their forward movements.

Each dog movement corresponds to that of the other in view of the identical relative positions of the lock and setting arms and, after being locked to the latter, of the ejector arms and when the parts return to normal positions the locking latches 302 are released from the lock and setting arms by striking against the stops 303, and the latches 305 again engage with the projections 306 to prevent ejector arm movement.

This return to normal positions is possible when the pawl 284 is tripped by depressing the button or key 82, the locking latch 287 of the latter having been removed from the locking position just before the parts had reached their limit of forward movement by the actuation of a bell-crank 320 carried by one of the bars 311 and to which the rod 289 is connected, Fig. 22, and this bell-crank 320 actuation in this last named direction is accomplished by means of the stop 314 on the corresponding dog 312.

In this machine it is highly desirable, it might be said necessary, to have all the zero keys occupy a normally depressed position, for a reason which will appear in the description of the operation, and I have accordingly provided a lever 321, Fig. 4, adjacent the bottom of the shell and in the path of movement of the projection 283 on the lock arm 279, this lever being held in normal position by means of a spring 322 and being provided with a spring controlled finger 323 which permits upward movement of the lock arm. An arm 324 of said lever 321 is connected by means of a rod 325 with an arm 326 upon a rock shaft 327 journaled in the shell 70, said rock shaft 327 carrying an arm 328 for each of the zero keys and bearing on a projection 329 thereof. When the lever 321 is rocked upon the return of the lock arm to normal position the shaft 327 is rocked and all of the zero keys are depressed simultaneously, their locking plates 90 yielding and afterward locking said keys in depressed positions.

Each of the stacks carries a vertically adjustable piston, 330, Figs. 45 to 48, inclusive, slotted for the passage of the ejector fingers and also for the lock bar 310 and, by reference to Fig. 48, it will be noted that the coins are supported upon two side surfaces of the pistons only, and these pistons cannot move downwardly until the lock bar 310 has been so moved, thereby preventing downward coin movement.

The toothed arcuate member 128 of the computing arm 105 is enmeshed with a gear 331 on a drum 332 provided with peripheral grooves and depressions to be later described in detail, said drum being rotatable upon a fixed shaft 333, the said drum being rotatable in the movement of said computing arm.

The toothed arcuate member 146 of the computing arm 106 is enmeshed with a gear 334 on a drum 335 on the shaft 333 also provided with peripheral grooves and depressions to be later described, and said member 146 is also enmeshed with a gear 336 on a drum 337 rotatably mounted upon a slidable shaft 338 carried in bearings 339, said drum 337 being maintained in normal position by means of a spring 340. The right hand end of the shaft 338 is provided with a finger 341 slidably guided in fixed guides 342 and projecting downwardly in the path of movement of the setting arm 290 whereby said finger 341 will enter the inclined groove 292 of said setting arm in the forward movement of the latter and, in the continued movement of said arm, said finger 341 passes to the peripheral groove 291 and the drum 337 is thus moved to the right, this drum 337 being the setting drum. Each of the drums 335 and 337 carries a series of vanes to be later described, and it will be seen that both the drums are rotated simultaneously and in like degree by the movement of the computing arm 106 and, at the end of such rotation, the degree of which is determined by the degree of movement of the computing arm, the setting drum 337 is longitudinally moved for a reason later explained.

The toothed arcuate member 151 of the computing arm 107 is enmeshed with a gear 343 on a drum 344 rotatable on the shaft 333, and this drum is also provided with a plurality of peripheral grooves and depressions to be later described.

The toothed arcuate member 156 of the computing arm 108 is enmeshed with a gear 345 on a drum 346 rotatable on the shaft 333, and this drum is also provided with a plurality of peripheral grooves and depressions to be later explained.

The pistons of the stacks 71, 72, 73, 74, 75, 76, 77, and 81 have downwardly directed piston rods 347, 348, 349, 350, 351, 352, 353, and 354, respectively, normally held at a slight distance above the respective selecting drums by the lock bar 310 but, when said lock bar is permitted to drop out of locking position, these rods bear on the respective drums, either on the periphery thereof to prevent downward piston movement or in a respective groove to permit and limit downward piston movement.

The drum 346 is provided with a peripheral groove 347$^a$ beneath or in the plane of the piston rod 347 of a single depth, with two grooves 348$^a$ in the plane of the piston rod 348 of a single depth and with continuations 348$^b$ of a double depth, and with four short grooves 349$^a$ in the plane of the piston rod 349 of single depth, these being for the $50.00, the $20.00, and the $10.00, denominational stacks.

The drum 344 is provided with a peripheral groove 350$^a$ of single depth in the plane of the piston rod 350, with two grooves 351$^a$ in the plane of the piston rod 351 of single depth continued to grooves 351$^b$ of double depth, and with four short grooves 352$^a$ of single depth, these being for the $5.00, the $2.00, and the $1.00, denominational stacks.

The drum 335 is provided with a peripheral groove 353$^a$ of single depth in the plane of the piston rod 353, this being the $.50 denominational stack, and the drum 332 is provided with two grooves 354$^a$ of single depth in the plane of the piston rod 354, continued to grooves 354$^b$ of double depth, continued to grooves 354$^c$ of triple depth, continued to grooves 354$^d$ of quadruple depth, this being for the $.01 denominational stack and clearly shown in Figs. 45 to 48, inclusive.

The drums 332 and 335 are provided with other grooves adapted to be entered by bellcranks in the manner described in my application above referred to, these being clearly shown in Figs. 4 and 44, and constitute the selectors for the $.25, the $.10, and the $.05, denominations, in order to deliver the fewest coins for a given amount of change and, consequently, the largest denominational units, as, for instance, a quarter, a dime, and a nickel for forty cents change instead of four dimes or eight nickels.

Slidably mounted on a shaft 355 supported in fixed position adjacent the drums 332 and 335 is a bell-crank 356 having a piston supporting arm 357 for the stack 80, having an arm 358 resting upon the drum 332 when the lock bar 310 is lowered, having a similar arm 359 resting upon the drum 335 under similar conditions, and having a nosing 360 arranged in proximity to the setting drum 337 in such manner as to be struck by an irregular though continuous vane 360ᵃ on said drum 337 in the movement of the latter to the right as hereinbefore described to slide the bell-crank 356 to the right under certain conditions, according to the degree of rotation imparted to the setting drum 337 in the movement of the computing arm 106. The arm 358 may enter, under certain conditions, one or the other of two grooves 358ᵃ and 358ᵇ of single depth in the drum 332, and the arm 359 is adapted to enter one of two grooves 359ᵃ of single depth or either one of two similar grooves 359ᵇ of single depth, under certain conditions, and the drum 335 is provided with a complemental vane 360ᵇ similar to the vane 360ᵃ though set farther to the right.

Slidably mounted upon the barrel of the bell-crank 356 is a similar bell-crank 361 having a piston supporting arm 362 for the stack 78, having an arm 363 adapted to bear on the drum 332 under certain conditions, having a similar arm 364 adapted to bear on the drum 335, and having a nosing 365 adjacent the drum 337 in such manner as to be struck by an irregular though continuous vane 365ᵃ on the setting drum 337 in the movement of the latter to the right. The arm 363 is adapted to enter a continuous groove 363ᵃ of single depth in the drum 332 doubled in width at 363ᵇ, and the arm 364 is adapted to enter either of two grooves 364ᵃ or of two grooves 364ᵇ of single depth in the drum 335, adjacent a vane 365ᵇ.

Slidably mounted upon the barrel of the bell-crank 361 is a similar bell-crank 366 having a piston supporting arm 367 for the stack 79, having an arm 368 for the drum 332, having an arm 369 for the drum 335, and having a nosing 370 for the setting drum 337 adapted to be struck by a three-step vane 370ᵃ on the setting drum, and the drum 335 has a complemental vane 370ᵇ. The arm 368 may enter a single depth groove 368ᵃ, a double depth groove 368ᵇ, ride therebetween on 368ᶜ, enter a double depth groove 368ᵈ or a single depth groove 368ᵉ, or ride on 368ᶠ to the right of the last named groove, there being three possible positions for the bell-crank 366 instead of two as with the other bell-cranks. The arm 369 may enter either of two single depth grooves 369ᵃ or either of two double depth grooves 369ᵇ in the same plane, or either of two single depth grooves 369ᶜ in another plane, or either of two double depth grooves 369ᵈ in still another plane.

The vanes on the setting drum 337 are so shaped as to move the respective bell-cranks to the right at predetermined degrees of revolution of the setting drum and of the drum 335 revolved therewith in like degree, the drum 332 being revolved independently of the drums 335 and 337, and the vanes on the drum 335 are for the purpose of returning the bell-cranks to normal positions, the piston supporting arms of all the bell-cranks having lateral movement in predetermined degrees in the respective pistons. A bell-crank cannot rock until its two drum bearing arms enter grooves, either single or double depth, and may then rock only so far as the depth of the shallower groove permits at the two ends of the bell-crank, thereby determining the distance of downward piston movement and accordingly determining whether no coin shall be ejected from a stack, if one shall be ejected, or if two shall be ejected or, in the case of the cents stack, if none, one, two, three, or four shall be ejected.

The lengths, depths, and positions of the grooves have all been carefully calculated to produce the desired result, it being understood that the depth of a groove is equal to the thickness of the unit in the stack thereover, or a multiple thereof, certain calculations being made hereinafter to clearly show this.

The monetary notes are contained in folded condition in cases shown at 371, Fig. 13, these being either of inexpensive material intended to be thrown away, or being of durable material for repeated use, but they are of uniform length, width, and thickness, and are preferably provided with characters indicating the contained monetary denomination, there being but one note in each case 371.

As shown in Figs. 61 to 63, the ejector bar 299 carries a lug 372 adapted to pass a spring actuated end 373 of a lever 374 pivoted at 375 normally held in the position shown by a spring 376 but adapted to be rocked in the backward movement of the ejector bar on its return to normal position, and the pivot 375 carries a short arm 377 which is prevented from downward movement by a fixed portion of the shell 70 but the arm 377 may swing upwardly under normal conditions to permit the lever 374 to rock when engaged by the lug 372 in the backward ejector bar movement. Slidably mounted in the plane of each stack is a bar 378 having a button 379 on its outer end and normally held in outermost position by the ejector bar 299 but forced inwardly, when said ejector bar moves inwardly, by means of a spring 380 to force the inner end of the bar 378 against the contained coins or note cases in the respective stack. The bar 378 is provided with a dependent member 381 normally engaged by the ejector bar, and with an upwardly and inwardly directed hook member 382 adapted to overlie the arm 377 to prevent rotation of the pivot 375 when the level of the stack contents is below the bar 378 to permit the spring 380 to force the said bar inwardly of the stack. When the pivot 375 is thus prevented from rotation, the lever 374 cannot rock and the lug 372 is stopped thereby to prevent backward movement of the ejector arm, and thus prevent return to normal positions of any of the parts of the machine until the bar 378 has been manually retracted and the stack may then be replenished. In this connection it will be noted that the bar 378 is set at a height above the ejector whereby a predetermined number of units contained in the stack still remain after inward movement of said bar, thereby permitting one or more subsequent machine operations though giving notice of the low condition of one or more of the stacks.

As the change is ejected from the several stacks, it passes to a chute 383 at the rear of the machine, facing the customer, and falls to a delivery opening 384 and thence to the supporting surface beneath the machine, ready to be picked up by the customer, and the several counters are also at this side of the machine for the observation of the customer.

As is well known in subtracting a larger numeral from a smaller it is necessary to "borrow" from the next digit to the left, and I have provided certain mechanism for accomplishing this result for the dimes, dollars, and tens of dollars, computing mechanism, the machine illustrated being limited to four digits, although it may be constructed for as many digits as may be desired, the parts merely being multiplied.

In Figs. 4, 49 to 60 inclusive, and 64ᵃ to 67! inclusive, I have shown this mechanism, as to relative position, as to structure, and as to operation, said mechanism comprising a shaft 385 carried by suitable supports 386 and having a toe 387 keyed thereto at the right hand end thereof in the path of movement of the smooth arcuate member 129 of the computing arm 105, but the member 129 does not reach the toe 387 until the computing arm 105 has traveled through ten spaces.

The shaft 385 is maintained in normal position by means of a spring 388, though yieldingly, and on the left hand end of the shaft carries a clutch member 389 having a spiral cam (390) on its face, having a circular axial recess, in its end, and having a lug 391 normally resting against a stop 392 on the support 386 to limit upward movement of the lug, and a stop 393 is provided, Fig. 55, to limit downward movement of the lug 391.

Carried by supports 394 is a shaft 395 on the axis of the shaft 385, the right hand end of the shaft 395 being cylindrical and rotatably held within the recess of the clutch member 389, whereas it is angular in cross section adjacent this cylindrical portion to insure rotation of a clutch member 396 with the shaft 395 while permitting sliding movement of said clutch member axially of the shaft, the clutch member 396 having a complemental spiral cam 397 on its right hand end similar to the cam 390. The clutch member 396 is rotatable within a ring 398 guided in the support 394 and having a finger 399 resting in the groove 148 of the computing arm 106, the forward movement of this arm for a sufficient distance, ten spaces, moving the ring and clutch member 396 to the right because of the cam connection between the grooves 148 and 149 in the computing arm 106. This sliding engagement of the two clutch members 389 and 396 causes the latter to rotate because of the cam faces 390 and 397 against a spring 400 if the former had been rotated out of normal position to depress the lug 391 by means of the toe 387 but, in the normal position of the former, the latter merely engages therewith, ready to be rotated thereby.

The shaft 395 carries a lug 401, Fig. 53, arranged in the path of movement of the smooth arcuate member 147 of the computing arm 106, and said shaft is also provided with a clutch member 402 at its left hand end having a lug 403 thereon normally resting against a stop on the support 394, this member 402 having a spiral cam 404 on its end and a recess similar to the clutch member 389, and a limiting stop 405 is provided on the support 394.

Carried by supports 406 is a shaft 407 on the axis of the shafts 385 and 395 having a cylindrical end rotatable in the recess of the clutch member 402 and having an angular portion adjacent thereto upon which is arranged a sliding clutch member 408 having a complemental cam face 409 and slidable by means of a ring 410 provided with a finger 411 resting in the groove 153 of the computing arm 107. The shaft 407 is provided with a lug 412 arranged in the path of movement of the smooth arcuate member 152 of the computing arm 107 and with a lug 413 normally held against a stop 414 on the support 406 by means of a spring 415, and a supplemental stop 416 is provided on said support to limit movement of the lug 413 in a downward direction, as shown in Figs. 50 and 51.

The lugs 391, 403 and 413 are in the plane of movement of the forward offsets 121 and 122 of the pawl arms 100, 101 and 102, respectively, and, as shown in Figs. 50 and 51, each is formed of a member freely rockable on the shaft 407 though held in desired relationship therewith; yieldingly, by means of a spring 417 whereby the lug member may be upwardly rocked against the action of the spring independently of the shaft 407 though downward or backward rocking rotates the shaft correspondingly.

The computing arm 105 is adapted, after ten spaces of movement, to rock the lug 387 through an arc of ninety degrees to correspondingly rotate the shaft 385 and thus depress the lug 391 into the path of movement of the forward offsets 121 and 122 of the pawl arm 100, this being accomplished by means of the smooth arcuate member 129 on the said computing arm and this shaft rotation also rotates the clutch member 389 and changes the position of the cam face 390 one fourth of a circle.

Similarly the smooth arcuate member 147 of the computing arm 106 may rock the lug 401 to rotate the shaft 395 and thus rock the lug 403 and cam face 404 through one fourth of a circle, thereby carrying the lug 403 into the path of movement of the forward offsets 121 and 122 on the pawl arm 101.

Similarly, the smooth arcuate member 152 of the computing arm 107 may rock the lug 412 to rotate the shaft 407 and thus rock the lug 413 through one-fourth of a circle to carry the latter into the path of movement of the forward offsets 121 and 122 on the pawl arm 102.

This machine, as shown, is for four digits only and borrowing can occur from three of them and there are, accordingly, but three of the transfer elements or units although the central unit might be duplicated or multiplied for any desired number of digits, as will be readily understood.

When the shaft 385 has been rocked out of normal position, sliding movement of the clutch member 396 to the right, by means of the groove in the computing arm 106, will engage the respective cam faces and will accordingly rotate the shaft 395 in the degree of rotation of the shaft 385, thereby rocking the lug 403 into lowered position, and this is also true of the shaft 407 and lug 413, but this only occurs after the respective computing arms have been moved a distance of ten spaces, a space being the distance between the axes of any two adjacent keys in any one of the banks, also the distance between two teeth on the fixed saw-tooth sectors 109, 110, 111, 112, 183, 184, 185 or 186.

As shown in Figs. 4 and 64ª to 67¹, inclusive, a fixed tooth 418 is provided at the upper end of the fixed key guiding plate 87 in the path of movement of the rear offsets 125 and 126 of the pawl arm 100, another tooth 419 in the path of movement of the pawl arm 101, and still rear offsets of the pawl arm 101, and still another in the path of movement of the rear offsets of the pawl arm 102 although this last one is not shown in view of the fact that the illustrated calculations do not exceed three digits, but its provision will be borne in mind.

The pawl arms all move in unison and always for the full limit of movement as determined by the swinging of the operating crank 96, but the computing arms and the plus and minus register arms move only for the number of spaces while they are in engagement with the respective pawl arms, and such engagement is determined by, the depressed keys in the respective banks, and by the positions of the respective lugs on the several transfer units, as will appear. Further, the lock and setting arms are similarly actuated and, in turn, actuate the ejector arms, but a considerable degree of movement of the pawl arms occurs before any actuation of the lock, setting, and ejector arms.

Having reference to Fig. 4. it will be recalled that the zero keys are normally depressed, and the several pawl arms are normally below the zero keys, whereby a slight movement of the pawl arms is possible without affecting any of the operative parts and, in the normal condition, if the operating handle be slightly moved the offsets 121 and 122 of the several pawl arms will engage with the plus zero keys and upon further handle actuation the several frames 118 of the pawl arms will be rocked into alternate position with the tooth 123 on each engaged with the respective computing arm and, in this tooth engagement, the computing arms have been released from the fixed saw tooth sectors by the depression of the respective plates 136 and raising of the respective pawls 130. In the further handle actuation the computing arms travel with the pawl arms until released therefrom, and the respective display wheels are rotated but, when so released, the computing arms are again locked to the respective saw-tooth sectors by means of the pawls 130 in the positions into which the arms had been moved.

Assuming that no keys had been manually depressed and the crank handle be actuated still further; in such actuation the pawl arms move forwardly with all the computing arms in engagement therewith, as no release therefrom has as yet been accomplished, until the rear offsets 125 and 126 of the several pawl arms engage with the minus zero keys. This engagement returns all the rocking frames 118 to normal positions and releases all the computing arms which then engage with the respective fixed saw-tooth sectors.

Because of the pawl 284 acting with the teeth 280 on the lock arm 279 no return of the handle or other parts can be made until this pawl is released from the arm 279, and this is only after the handle has been moved for its full limit of movement, as already described, the computing arms, however, having been carried a distance of only ten spaces, the rocking frames 118 being of a length, each, to insure such result.

In the computing arm movement the several drums had been rotated through ten degrees of revolution, there being ten divisions on each, from 0 to 9, and when the computing arms were dropped by the pawl arms, after ten spaces of movement, the drums were carried to initial position in which none of the pistons can move downwardly and thus no money has been lowered into ejecting position.

In the further handle operation, after the computing arms had been dropped by the pawl arms, the lock and setting arms 279 and 290 trip the dogs 312 to permit the lock bar 310 to drop to unlock the pistons in the several stacks but, as stated, these pistons cannot move downwardly with the drums in initial or zero positions. The lock and setting arms also actuated the ejecting arms 295 and 296 but without delivering any money and, at the approximate completion of the possible handle movement, the "reset" lock 287 is released to permit depression of the "reset" key 82 to release the pawl 284 from the lock arm and the parts resume their normal positions because of the springs 98, Fig. 4, though not before the dogs 312 had been returned to normal positions to again raise the stack lock bar 310 into locking position. Upon the return of the pawl arms toward normal positions the computing arms are released from the respective fixed saw-tooth sectors and carried to normal positions, as already described with reference to Figs. 4 and 4ª, the "received" and "change" display wheels resuming zero positions, and nothing having been accomplished by the handle operation. This absence of result is always true of all the digits in which no plus or minus keys had been manually depressed and, therefore, no results follow handle operation except with respect to the parts operated by depressed keys in one or more banks in making a calculation..

Figs. 64ª to 64ᵈ diagrammatically illustrate an example wherein seventy-five cents was tendered for a sixty cents purchase to deliver fifteen cents change. This involves but two pairs of banks of keys, the units and dimes, involving the banks 84, 84ª, 83 and 83ª, 84 and 83 being the plus banks and 84ª and 83ª the minus banks.

In this calculation the plus key "7" in bank 84 and the plus key "5" in bank 83 are first depressed to indicate the money received, the zero keys of these banks rising upon depression of the manually depressed keys as already described, and the manually depressed keys remain in depressed condition.

The "6" key of the 84ª bank is now depressed and the normally depressed key "0" in the 83ª bank is permitted to remain depressed, this setting the machine for the amount of purchase. Upon handle operation the pawl arm 99, Fig. 4, moves upwardly until the forward offsets 121 and 122 thereon engage with the depressed plus key "5" of the 83 bank, upon which the frame 118 of this pawl arm is rocked to lock the tooth 123 thereof to the computing arm 105 which is thereby released from the fixed saw-tooth sector 109.

Upon further handle operation the computing arm 105 is carried forwardly until the rear offsets 125 and 126 of the pawl arm 99 engage the depressed minus "0" key whereupon the frame 118 of this pawl arm resumes its normal position, the computing arm 105 is released from this pawl arm, and is locked to the fixed sector 109. The depressed plus key "5" determined the moment of start of computing arm movement and five spaces thereafter the minus key "0" stopped the computing arm movement, and the unit five appears at the window 144.

In this handle operation the computing arm 106 is carried forwardly until dropped by the pawl arm 100 and this result is also shown at the window 114. The pawl arm 100 moves forward until the forward offsets 121 and 122 engage with the depressed key "7", Fig. 64ª, whereupon said pawl arm is locked to the computing arm 106 and carries the latter with it until the rear offsets 125 and 126 engage with the depressed key "6", the minus key, and the computing arm 106 is released from the pawl arm. The distance of travel is the three spaces after plus key "7" added to the six spaces from zero to minus "6" key, and the dial or display wheel turns nine spaces bringing "1" into view at the window 144, thus indicating fifteen cents change.

The finger 124 of the pawl arm 99 had meanwhile carried the plus register arm 175 along with it until plus "5" key in bank 83 engaged the forward offsets of said pawl arm to rock the frame 118 therein, this causing the finger 124 to drop and pass beneath the loose stop 190, thereby permitting the spring 189, Figs. 36 to 38, to force the pawl 187 into engagement with the portion 183ª of the stepped sector 183, the five space movement of the plus register arm turning its display wheel accordingly to display "5" in the units row of the window 216.

It will be recalled that there was a further five space movement of the pawl arm before the minus "0" key has returned the rocking frame 118 to normal position and thus raised the finger 124 into normal position whereby it passed over the minus register arm 179 and the display wheel thereof was not actuated from its normal position of "0" in the units row of the window 247.

The finger 124 of the pawl arm 100 reached plus key "7" before the frame 118 was rocked into alternate position to drop said finger beneath the loose stop 190, and the plus register arm 176 therefore moved seven space to actuate its display wheel to bring "7" into view at the window 216, in the tens row, "75" now showing in this window for the amount received.

A movement of the pawl arm 100 of nine spaces occurred thereafter before the frame 118 was returned to normal position, and the finger 124 thereof was therefore in lowered position for a nine space movement of the pawl arm. It required a three space movement of the finger 124 to complete the 183ᵃ portion of the stepped sector 184, from "7", before it could engage the minus register arm 180 and, upon releasing the minus register arm 180, a movement of nine spaces less three spaces making six spaces had occurred, thereby indicating "6" in the tens row of the window 247, therefore showing "60" at this window, being the amount of purchase.

The computing arms 105, 106, and plus and register arms 175 and 176 and 179 and 180, Figs. 6ᵃ, 36 to 40, have all been moved for definite distances of a selective number of spaces and dropped by the pawl arms 99 and 100, but the pawl arms continue their movement during the handle actuation.

In the computing arm movements the respective drums had been rotated correspondingly to carry certain grooves beneath the piston rods of the several stacks, and beneath the bell-cranks of other pistons, as will be later explained, but attention is here drawn to a provision that the pawl arms move through a distance of twenty-one spaces before the lock and setting arms become operative, this insuring that all drum adjustments shall have been made and the drums be held stationary while the stack lock bar is being lowered and the ejection taking place, and it must be also observed that no actuation of the minus register arm may occur until the pawl-arm, for any digit, shall have traveled a distance of ten spaces, and actuation thereof may not occur even then if the frame 118 of a pawl arm is in normal position.

From the foregoing it will be noted that the manually depressed keys accomplish nothing by the depression movement but act upon certain movable parts brought into contact therewith in the crank handle operation, and the normally depressed zero keys in all the banks insure rocking of the respective pawl arm frames 118 and thus insure moving of the respective computing arms. Reverting to Figs. 36 to 40, inclusive, and to the machine operation when no keys have been manually depressed though all the zero keys are in their normal depressed positions, it will be recalled that the rocking frames 118 of all the pawl arms had been rocked into alternate positions by the plus zero keys, with the result that the several fingers 124 of the pawl arms had dropped, thereby permitting the several springs 189 to force the several pawls 187 into engagement with the respective sawtooth sectors, whereby the plus register arms are locked in initial or zero positions. After a ten space movement of the pawl arms the frames 118 are again rocked into normal position, thus raising the respective fingers 124 above the minus register arms, and no actuation of any of the plus or minus register arms has occurred, and this is highly important in view of the fact that it is only these register arms which act on the totalizer and, obviously, no advance on the totalizer should occur upon a handle operation when no calculation is being made.

In this calculation described with reference to Figs. 64ᵃ to 64ᵈ, the drum 332 had been rotated five spaces for the reason that the computing arm 105 had been moved five spaces, thereby bringing the single depth groove 358ᵃ beneath the bell-crank arm 358 and as the single depth groove 359ᵃ is beneath the arm 359 of this bell-crank, the piston of the stack 80 is free to drop one step when the lock bar 310 is dropped, the drum 332 being locked in this position because its complemental computing arm 105 is locked against movement.

The drum 335 had been rotated nine out of its ten spaces, thereby carrying the groove 359ᵃ beneath the arm 359, though on the "1" line of Fig. 44, and the piston of the five cent stack 80 may move down as above stated with the drum 335 also locked against further movement.

The five space rotation of the drum 332 had carried the double depth groove 368ᵈ beneath the arm 368 of the bell-crank 366 and the nine space rotation of the drum 335 had carried the single depth groove 369ᵃ beneath the arm 369 of this bell-crank, and the piston of the stack 79 may move down one step, because of the single depth groove 369ᵃ, when the lock bar 310 permits such piston movement.

Upon further handle operation the lock and setting arms, 279 and 290 respectively, engage the ejector arms 295 and 296 and swing them forwardly to eject one dime and one nickel, the dogs 312 having been rocked meanwhile by the lock and setting arms to lower the lock bar 310, and delivery of the exact change is accomplished in the fewest units.

The setting drum 337 had been moved to the right by means of the groove in the setting arm 290 after the selecting drums 332 and 335 had been locked in adjusted positions, but in view of the positions of the arms 359 and 369 adjacent the vanes 360$^b$ and 370$^b$ no sliding of the bell-cranks 356 and 366 occurred by means of the vanes 360$^a$ and 370$^a$ of the drum 337.

After the crank handle has reached its limit of movement the key locks 90 are all drawn upwardly by means of the link 308 and the manually depressed keys resume their normal positions and, when the "reset" key has been depressed the spring 98, Fig. 4, returns the parts to normal positions. In this return the projection 283 of the lock arm 279 rocks the shaft 327 to depress all the zero keys in all the banks and the machine is ready for another operation.

The pawl arms have a travel of twenty-one spaces before the lock and setting arms become operative, and within these spaces all desired adjustments of the computing arms and of the plus and minus register arms are accomplished. In the foregoing calculation no borrowing from an adjacent digit was necessary, nor in the calculation diagrammatically shown in Figs. 65$^a$ to 66$^d$, wherein sixty cents was paid for a sixty cents purchase.

In this the plus zero key in bank 83 rocked the frame 118 of pawl arm 99 and the computing arm 105 was carried for ten spaces before the frame 118 was returned to normal position by means of the minus zero key in bank 83$^a$, whereby nothing was recorded for this unit digit nor was any change delivered for the reason that the drum 332 made a complete rotation to carry the zero line back beneath the stack controls. The frame 118 having been rocked at the beginning of the pawl arm movement the finger 124 thereof dropped out of engagement with the plus register arm 175 and, after the ten space movement, the frame 118 being returned to normal position by the minus key in bank 83$^a$ the finger 124 rose above the minus register arm 179 and no actuation of either occurred.

The pawl arm 100 had its frame 118 rocked when "6" depressed key was reached in the plus bank 84 and a ten space movement of the computing arm 106 resulted before the frame 118 was returned to normal position by minus key "6" in bank 84$^a$, and this computing arm movement rotated the drum 335 through a complete revolution whereby no change was delivered for the tens digit, and nothing was registered at the window 144 in either units or tens digits.

The six space movement of the pawl arm 100 to reach plus "6" key in bank 84 carried plus register arm 176 for six spaces before releasing the same, and this plus register arm registered "6" at the window 216 in the tens row, the zero in the units row not having been changed, as above stated. The pawl arm 100 traveled four spaces before passing from the portion 183$^a$ of the stepped sector 184 and the finger 124 thereof now being in lowered position the minus register arm 180 is engaged thereby and moved the remaining six spaces of the ten space movement of the pawl arm between the first and second rockings of the frame 118 thereof, the minus register arm 180 now being locked in place and registering "6" in the tens row at the window 247, the zero in the units row at this window not having been changed as the plus and minus register arms 175 and 179 had not been moved. This minus arm movement is imparted to the totalizer but, as stated, only this arm can affect the totalizer.

After the crank handle is moved to its outward limit the reset key 82 may be depressed and all the parts will resume normal positions, ready for another operation of the machine.

A borrowing calculation for two digits is shown diagrammatically in Figs. 66$^a$ to 66$^d$, based upon twenty-five cents received for a nineteen cent purchase requiring six cents change. The pawl arm 99 had its frame 118 rocked after a five space movement to the "5" key, depressed, in bank 83 and traveled fourteen spaces before the minus key "9" in bank 83$^a$ returned the frame to normal position. The drum 332 had thus been rotated fourteen spaces or four more than a complete revolution, which deducted from twenty spaces of two complete revolutions leaves six spaces, thereby carrying the line "6" of Fig. 44 beneath the stack controls, thereby bringing the single depth groove 354$^a$ beneath the piston rod 354 ready for the delivery of one cent.

In this fourteen space movement of the computing arm 105 the arcuate member 129 thereon reached and rocked the toe 387 and the lug 391 was lowered into the path of movement of the forward offsets 121 and 122 of the pawl arm 100, shown in Fig. 66$^b$, and the display wheel of this computing arm registers "6" at the window 144 in the units row. The plus register arm 175 had been moved five spaces before the depressed "5" key in bank 83 rocked the frame 118 to release said arm, and the "5" is registered at the window 216 in the units row. The pawl arm 99 traveled five more spaces before it passed the 183ª portion of the stepped sector 183 and then traveled nine more spaces to complete the fourteen spaces of movement before the frame 118 resumed normal position because of the depressed minus key "9" in bank 83ª, and the minus register arm 179 is thus moved nine spaces and registers "9" at the window 247 in the units row, and also correspondingly actuates the totalizer.

The pawl arm 100, Fig. 66ª, has its frame 118 rocked at plus key "2" of bank 84 and travels nine spaces before the frame 118 is returned to normal position by the minus key "1" in bank 84ª, thus moving the computing arm 106 nine spaces to bring the "1" into view at the window 144, though only temporarily. In the further forward movement of the pawl arm 100 the forward offsets 121 and 122 thereof strike against the lug 391, now in lowermost position as above described, and the frame 118 of this pawl arm is again rocked and again engages the computing arm 106 and moves the same one space at which time the rear offsets 125 and 126 of the pawl arm 100 strike against the fixed stop or tooth 418 and the frame 118 resumes its normal position. In this one space movement of the computing arm the "0" is carried into view at the window 144 in view of the fact that all the display wheels rotate backward, and ".06" is revealed at this window.

The computing arm 106 has thus been moved ten spaces and the drum 385¹ is revolved entirely to return zero position beneath the stack controls, and no change is delivered with respect to this selecting drum. However, in view of the fact that the groove 359ª is beneath the arm 359 of the bell-crank 356 and the groove 358ª is beneath the arm 358 thereof, the piston of the stack 80 may move down one space, these grooves both being single depth and the groove 358ª having been carried into such position by the partial rotation of the drum 332 already described, and a nickel is delivered upon the completion of the handle operation, together with one cent as already described, thus making six cents change.

In the movement of the pawl arm 100 to depressed plus key "2" of bank 84, the plus register arm 176 had been moved two spaces before released from the pawl arm, and this "2" is registered in the window 216, making ".25" at this window. The pawl arm then moved eight spaces to clear the portion 183ª of the stepped sector 184 and then one more space to complete the original nine spaces and the minus register arm 180 is thus moved one space and registers "1" at the window 247 in the tens row, thus showing ".19" at this window, amount of purchase, and the totalizer is correspondingly affected.

It will thus be seen that the borrowing is done by reëngaging the computing arms by the respective pawl arms by means of the depressed lug 391 or its respective mates and the movement of the computing arms so reëngaged one additional space, the borrowing thus being entirely under the control of the transfer mechanism shown in Figs. 49 to 60, inclusive.

In the first calculation of sixty cents purchase from seventy-five cents tendered there was no occasion for transfer as no borrowing was necessary, this being shown in Fig. 57. In the second calculation of sixty cents tendered for a sixty cents purchase the arcuate member 129 had just reached though not rocked the toe 387 as only a ten space movement had occurred, but the groove 148—149 of the computing arm 106 had moved the clutch member 396 to the right without rotation thereof, this movement occurring just before the completion of the tenth space.

In the third calculation of twenty-five cents tendered for a nineteen cents purchase the toe 387 had been rocked by the arcuate member 129 to depress the lug 391 into the path of movement of the pawl arm 100, as shown in Fig. 66ᵇ, whereby borrowing resulted from the tens digit.

In Figs. 59 and 60 and 67ª to 67¹ a three digit calculation is shown, in which two dollars and fifty cents, gold, was tendered for a purchase of one dollar and ninety-five cents:

In the handle actuation, after the plus "2," plus "5," and plus "0" keys in the banks 85, 84 and 83, and the minus "1," minus "9" and minus "5" keys in the banks 85ª, 84ª and 83ª, had been manually depressed with the exception of the plus zero key in bank 83, normally depressed, the pawl arm 99 is immediately engaged with the computing arm 105, Fig. 67ᵏ, and moves fifteen spaces before the frame 118 is returned to normal position by the minus key "5," Fig. 67¹, thus registering "5" at the window 144 in units row and turning the drum 332 through one and one-half revolutions to carry the "5" line, Fig. 44, beneath the stack controls, and as the arcuate member 129 on the computing arm 105 strikes and rocks the toe 387 the lug 391 is moved into the path of movement of the pawl arm 100 in view of the fact that borrowing is necessary.

Inasmuch as the frame 118 of the pawl arm 99 was immediately rocked by the plus zero key in bank 83, the finger 124 of this pawl arm is released from the plus register arm 175 to permit its being immediately locked to the stepped sector 183, and no actuation of the plus register arm 175 occurs nor of the unit display wheel at the window 216, "0" being shown.

The pawl arm 99 moved fifteen spaces, as stated, and the minus register arm 179 was thus moved five spaces and correspondingly affected the totalizer in the units row and displayed a "5" in the units row of the window 247.

The pawl arm 100 moved five spaces to plus "5" key, depressed, in bank 84 before it engaged with the computing arm 106 and then moved fourteen spaces with this computing arm until released therefrom by the minus key "9", depressed, in bank 84ª, this fourteen space movement of the computing arm 106 being transmitted to the tens row at the window 144 to display a "6" thereat temporarily, and revolving the drum 335 through one complete revolution and four additional spaces, thus carrying line "6", Fig. 44, beneath the stack controls, temporarily. Upon further forward movement of the pawl arm 100 the forward offsets 121 and 122 thereof strike the lug 391, now depressed, and the pawl arm 100 is again engaged with the computing arm 106 and moves the same forwardly one space until the rear offsets 125 and 126 strike against the fixed tooth 418, and the tens row at the window 144 now displays a "5", making ".55", while the drum 335 moves one additional space to carry the "5" line, Fig. 44, beneath the stack controls. This brings the grooves 358ª and 359ª, single depth, beneath the arms 358 and 359 and the piston of the stack 80 may descend, when the lock bar 310 is dropped, to carry a nickel into the path of the ejector. Likewise, the groove 353ª, single depth, has been carried beneath the piston rod 353 and a fifty-cent piece is carried into ejecting position, making fifty-five cents change.

The groove 148—149 in the computing arm 106 had carried the clutch member 396 to the right and, because of the cam faces 390 and 397, the lugs 401 and 403 were rocked, the latter into the path of movement of the pawl arm 101 and the former into rearward position to permit the passage of the smooth arcuate member 147 of the computing arm 106. In this connection it should be noted that in the event of the lug 391 not having been lowered, because of no borrowing by the units digit, and the cam face 390 had not been rotated into alternate position, the lug 403 could still be rocked to borrow from the hundreds digit by the engagement of the smooth arcuate member 147 of the computing arm 106 with the lug 401, thereby enabling independent setting of the separate transfer units, according to the borrowing necessities of the several digits.

The steps of operation of the pawl arm 99 and computing arm 105 are shown in Figs. 67ᵏ and 67ˡ, while the steps of operation of the pawl arm 100 and computing arm 106 are shown in Figs. 67ᶠ to 67ʲ, inclusive.

In the initial five space movement of the pawl arm 100 the plus register arm 176 was carried five spaces and then locked to its stepped sector 184, thereby registering "5" in the tens row at the window 216. The pawl arm 100 then moved fourteen additional spaces to carry the computing arm 106 that distance, five of which were necessary to clear the portion 183ª of the stepped sector 184 and nine after engagement with the minus register arm 180, thereby recording "9" in the tens row at the window 247, and correspondingly affecting the totalizer.

The several steps of operation of the pawl arm 101 and computing arm 107 are shown in Figs. 67ª to 67ᵉ, inclusive, the pawl arm 101 first moving two spaces before having its frame 118 rocked by the plus key "2" in bank 85 to lock the pawl arm to the computing arm 107. The pawl arm and computing arm 107 thereafter moved nine spaces to carry the rear offsets 125 and 126 to the minus key "1" in bank 85ª to release the computing arm from the pawl arm and to lock the former to its toothed sector 111, thereby making an eleven space movement of the pawl arm 101. The nine space movement of the computing arm 107 carried the "1" into view at the window 144 temporarily, and rotated the drum 344 to bring the "1" line, Fig. 44, beneath the stack controls temporarily.

Upon the further forward movement of the pawl arm 101 the forward offsets 121 and 122 thereof strike against the rocked lug 403 and the frame 118 of said pawl arm is rocked to again engage the computing arm 107 to carry the latter with the pawl arm, this being for only one space for the reason that the rear offsets 125 and 126 of the pawl arm encounter the fixed tooth 419 and the computing arm 107 is again released from the pawl arm and again locked to its toothed sector, this one space movement bringing "0" into view at the window 144 and carrying the "0" line, Fig. 44, of the drum 344 beneath the stack controls, to prevent the delivery of any change for the hundreds digit.

In the initial two space movement of the pawl arm 101 the plus register arm 177 was moved two spaces and then released from the pawl arm, this two space movement bringing "2" into view at the window 216 in the hundreds digit, showing now "$2.50" received. The pawl arm thereafter made a movement of nine spaces before its frame 118 was rocked back to normal position, eight of these spaces being required to clear the portion 183ª of the stepped sector 185 leaving one space for moving the minus register arm 181, thereby carrying "1" into view at the window 247 in the hundreds row, now revealing "51.95" amount of purchase, and the totalizer was correspondingly affected.

Upon full crank handle operation the fifty-five cents change is delivered and, upon depression of the reset key 82, the parts return to normal positions, ready for a new calculation.

As stated, Figs. 59 and 60 show the steps of the operation of the transfer units for the last calculation, the toe 387 having rocked the lug 391 downward and the cam faces 390 and 397 depressed the lug 403 when the clutch member 396 was moved to the right by the groove 148—149 in the computing arm 106, and also by means of the arcuate member 147 of this arm. This would be repeated for the transfer unit at the left of Figs. 49 and 57 to 60, inclusive, if subtraction was to be made from the fourth digit. The transfer units would all be actuated in the event of subtracting one digit from four digits, as five cents from ten dollars, but the right hand unit would not be actuated if fifty cents was subtracted from ten dollars, nor would the two right hand units be actuated if five dollars was to be subtracted from ten dollars.

As an illustration of the function of the vanes on the drums 335 and 337 let us assume that change to the amount of twenty cents is to be delivered. The drum 335 would have been rotated to bring the line "2" thereof, Fig. 44, to the top, at which time the arm 369 of the bell-crank 366 would be two spaces to the left of the groove 369$^d$. The drum 337 would have been rotated accordingly to bring its line "2" to the top, and this rotation would cause the undulation of the vane 370$^a$ on this line "2" to come abreast the nosing 370, as may be seen by striking a line down over the two drums. After the drums have been so set the drum 337 is moved axially to the right by the groove 292 of the setting arm 290, this being a two-space movement, and this would push the nosing 370 two spaces to the right, whereby the bell-crank 366 is moved to the right to carry the arm 369 directly over the double depth groove 369$^d$. In this sliding of the bell-crank 366 to the right the arm 368 thereof was moved two spaces to the right directly over the double depth groove 368$^b$ and the piston of the stack 79 may then move downward two steps to deliver two dimes.

When the reset key 82 is depressed to permit the parts to return to normal positions the upper inclined end of the undulation of the vane 370$^b$ on the line "2" of the drum 335 will strike the arm 369 and will return the bell-crank to its normal position, the degree of bell-crank movement being controlled by the width of the slot in the respective piston for the reception of the arm 367 of the stack 79 or the complemental arm of the other bell-cranks.

One characteristic of my machine is the intercepting of certain manually moved elements by selectively set keys to make and record the calculations corresponding to the particular keys set, and to select and deliver a correct amount of change in the fewest number of denominational units inasmuch as the largest possible units are selected, the operation of setting the keys in no way affecting the other parts of the machine.

Another characteristic is that of the normally depressed zero keys in all the banks, the zero key in any bank rising from normal position upon the depression of any other key in that bank.

Another characteristic is the arrangement of the plus and minus keys in pairs of banks.

Another characteristic is the forward movement of certain elements for selectively defined distances for the plus calculations, and continued forward movement for the minus calculations, resulting in a subtraction in a single forward crank handle operation. The calculations are based upon the decimal system in the present machine and, to subtract a larger number from a smaller, it is necessary to move the parts for more than ten spaces. What actually occurs is to subtract a given number from ten and move the parts for a number of spaces equaling the difference as, for instance, four being the given number in the units digit the pawl arm 99 is moved four spaces before the computing arm 105 is engaged therewith, after which at least six spaces are traversed before a set zero key in the minus bank can release the pawl arm from the computing arm, the operation thus being backward, and this constitutes the basis of operation. If the given number in the minus bank be more than zero a correspondingly increased number of spaces is traversed by the computing arm as, if four be the given minus number, four more spaces over the six must be traversed, making ten spaces, and the unit drum and unit display wheel make a complete revolution to zero position, as four from four leaves nothing.

Another characteristic is the automatic transfer from one digit to another independently of the other digits either to the right or left or intervening, the transfer units all set in one operation and having no movement thereafter, and all the transfers are made simultaneously, as distinguished from the successively actuated transfer units in calculating machines now known to me. While all the transfer units are set simultaneously, any or all of the units intervening between two separated transferring units are passive, ready for transferring but not accomplishing anything, inasmuch as the actual transfers are made by the respective computing arms determined by their distances of travel and the actuation is directly on the rocking frames of the respective pawl arms. One highly important feature of this construction is that no disengagement of the selecting and recording elements occurs during a transfer inasmuch as the computing arms and the respective drums and display-wheels are in constant engagement.

Another characteristic is the pawl arm construction, operable by normally or selectively depressed keys in opposite directions by the plus and minus keys of the respective pair of banks.

Another characteristic is the stack lock which prevents any cash withdrawals until the selective and computing elements have been actuated into definite positions.

Another characteristic is the necessity for operating the crank handle for its full movement before it can return to initial position.

Another characteristic is the low change warning means.

And another characteristic is the note holding case, either of durable material for repeated uses or of inexpensive material for but one use, and these may be transparent if desired to reveal the denomination of the contained note.

Having fully described my invention, what I claim as new, and desire to secure by Letters Patent, is:—

1. In a calculating machine, an operating element, and a plurality of computing units, one for each digit of a number and each movable in one direction throughout its computing operation, the units being actuated singly or plurally in any combination by a single motion of the said element for subtracting the amount of purchase from the amount tendered.

2. In a calculating machine, an operating element, and a plurality of computing units, one for each digit of a number and each movable in one direction throughout its computing operation, the units being actuated singly or plurally in any combination by a single motion of the said element for delivering change between an amount tendered and the amount of a purchase.

3. In a calculating machine, an operating element operative by a continuous motion in one direction, and means including computing units, one for each digit and movable by the operating element in one direction throughout their computing operations for making a plus calculation in the first part of the movement of the said element and for making a minus calculation in the remaining part of the stroke of the said element.

4. In a calculating machine, an operating element operative by a continuous motion in one direction, means including computing units, one for each digit and movable by the operating element in one direction throughout their computing operations for making a plus calculation in the first part of the movement of the said element and for making a minus calculation in the remaining part of the stroke of the said element, and means for selecting and delivering the difference between the plus and minus calculations.

5. In a calculating machine, an operating element operative by a continuous movement in one direction, a plurality of manually operative keys, and means including a plurality of computing units normally free from the keys and movable in one direction throughout their entire computing operation and adapted to contact with associated operated keys, whereby the said units can be operated by the said element for subtracting a smaller from a larger amount in one operation of the said element.

6. In a calculating machine, an operating element, a plurality of banks of manually operative keys arranged in pairs for different digits, and means including a computing unit for each pair of banks movable in one direction throughout its computing operation and adapted to contact with operated keys of its associated banks, whereby the units can be operated by the said element for subtracting a smaller amount from a larger amount in one operation of the said element.

7. In a calculating machine, an operating element operative by a continuous motion in one direction, a plurality of banks of keys arranged in pairs for different digits, and means including computing units normally disengaged from the keys and movable in one direction throughout their computing operation, each unit being adapted to contact with an operated key in one associated bank during the first part of the movement of the said element and with an operated key in a complemental bank for subtracting a smaller amount from a larger during the further movement of the said element.

8. In a calculating machine, an operating element, and means, including computing units movable in one direction throughout their computing operation, for registering a larger of two amounts in a partial movement of said element, for registering a smaller amount in a further movement of said element, and for registering the difference between said amounts, said means being operated by said element.

9. In a calculating machine, an operating element, means, including computing units movable in one direction throughout their computing operation, for registering a larger of two amounts in a partial movement of said element, for registering a smaller amount in a further movement of said element, for registering the difference between said amounts, and means for selecting and delivering the said difference in change in a further movement of said element, said movements being all in the same direction.

10. In a calculating machine, an operating element, a plurality of banks of manually operative keys arranged in pairs, a pawl arm actuated by said element for each pair of banks, means on said pawl arm for engagement with an operated key in one bank of a pair and means on said pawl arm for engagement with an operated key in the other bank of a pair, to select the difference between a larger and a smaller amount.

11. In a calculating machine, a change selecting mechanism, an operating element therefor, a plurality of manually operative keys arranged in banks numbered from zero to nine and movable into the path of movement of said mechanism to actuate the latter to subtract a smaller amount from a larger, the zero key in each of said banks being normally in operative position, and means operated by and adapted for holding operated keys in operative positions and release the zero key.

12. In a calculating machine, a change selecting mechanism including computing units movable in one direction throughout their computing operation, an operating element therefor, a plurality of manually operative keys arranged in banks and movable into the path of movement of said mechanism to actuate the latter to subtract a smaller amount from a larger, and means for holding an operated key in operative position, said operated key in each bank being released to return to normal position upon the movement of another key in the same bank into operative position.

13. In a calculating machine, a change selecting mechanism including computing units movable in one direction throughout their computing operation, an operating element therefor, a plurality of banks of manually operative keys numbered from zero to nine and movable into and out of the path of movement of said selecting mechanism, to subtract a smaller amount from a larger, means for holding the zero key in each bank, adjacent the normal position of said mechanism, in the path thereof, and means for normally holding the remaining keys of each bank out of the path of movement of said mechanism.

14. In a calculating machine, a change selecting mechanism including computing units movable in one direction throughout their computing operation, an operating element therefor, a plurality of banks of manually operative keys numbered from zero to nine and movable into and out of the path of movement of said mechanism, means for holding the zero key in each bank, adjacent the normal position of said mechanism, in the path thereof, and means for normally holding the remaining keys out of the path of movement of said mechanism, the movement of any key into operative position releasing the key normally in operative position of the respective bank, and means for moving said last named key out of operative position when another key in its bank is moved into operative position.

15. In a calculating machine, an operating element operative by one continuous movement in one direction, a plurality of manually operative keys, and means co-acting with operated ones of said keys and actuated by said element for subtracting a smaller amount from a larger, said means being normally disconnected from the keys and unaffected by the movement of the operated keys into operative positions.

16. In a calculating machine, an operating element, a plurality of manually operative keys, and means including computing units movable in one direction throughout their computing operations actuated by said element for subtracting a smaller amount from a larger in one operation of said element, said means being movable a number of spaces determined by one operated key and said movement being continued for a number of spaces determined by another operated key.

17. In a calculating machine, an operating element, a plurality of manually operative keys arranged in pairs of banks, and means including computing units movable in one direction throughout their computing operations actuated by said element for subtracting a smaller amount from a larger in one operation of said element, said means being movable a number of spaces determined by an operated key in one bank of a pair, and said movement being continued for a number of spaces determined by an operated key in the other bank of said pair.

18. In a calculating machine, a change selecting mechanism including computing units movable in one direction throughout their computing operations, an operating element therefor, a plurality of manually operative keys arranged in banks and movable into the path of movement of said selecting mechanism to subtract a smaller amount from a larger, means for normally holding one key in each bank in operative position, and means for returning said normally operative keys to normal positions, if moved therefrom, in the return of said operating element to normal position.

19. In a calculating machine, a plurality of change stacks, a vertically movable piston in each stack, a change selecting mechanism including computing units movable in one direction throughout their computing operations, an operating element therefor, a control for each piston, and a plurality of manually operative keys movable into the path of movement of said mechanism and acting on said mechanism to deliver the change between a larger amount tendered and a smaller amount of purchase.

20. In a calculating machine, a plurality of change stacks, a control for each stack, a change selecting mechanism including computing units movable in one direction throughout their computing operations, an operating element therefor, and a plurality of manually operative keys arranged in pairs of banks and movable into the path of movement of said mechanism to deliver the change between an amount tendered and the amount of a purchase, said units being rotated through a complete revolution when keys of the same value in the banks of a pair are in operative positions.

21. In a calculating machine, a plurality of change stacks, a control for each stack, a change selecting mechanism, an operating element, an ejector, means operated by the said element for actuating the ejector, and means for preventing the return of the operating element to normal position upon the depleted condition of any stack.

22. In a calculating machine, a plurality of change stacks, a control for each stack, a change selecting mechanism, an operating element therefor, an ejector, means operated by the said element for actuating the ejector, means for preventing the return of the operating element to normal position upon a depleted condition of any stack, and external means connected therewith for communicating said depleted condition in any stack.

23. In a calculating machine, a change selecting mechanism, a plurality of change stacks, a control for each stack, an ejector, means for operating said mechanism and ejector, means for preventing the return of the said means to normal position upon the depleted condition of any stack, and external means for releasing said prevention means for the depleted stack.

24. In a calculating machine, a plurality of change stacks, a piston in each stack, a vertically movable horizontal bar passing through and having a lost motion connection with all of said pistons, a change selecting mechanism, means for operating said mechanism, and means for lowering the bar for transferring the weight of said pistons and stack contents to said selecting mechanism after the latter has been set, said bar normally supporting the weight of said pistons and stack contents.

25. In a calculating machine, an operating element, means including computing units movable in one direction throughout their computing operations actuated thereby for subtracting a smaller from a larger number, and means for deducting one from a digit in the minuend when a digit in the minuend to the right thereof is less than the digit in the subtrahend.

26. In a calculating machine, an operating element, means including computing units movable in one direction throughout their computing operations actuated thereby for substracting a smaller from a larger number, and a transfer mechanism comprising a unit for each digit of a number for borrowing from a minuend digit to the left of a minuend digit smaller than the subtrahend digit of said last named digit.

27. In a calculating machine, an operating shaft having a continuous movement always in one direction for any calculation, a plurality of pawl arms keyed thereto, a toothed sector fixed adjacent each pawl arm, a toothed segment normally locked to each sector, a plurality of manually operative keys arranged in plus and minus banks numbered from zero to nine and movable into and out of the path of said pawl arms, means for holding the zero key in each bank in operating position normally, the plus zero key serving to initiate and the minus zero key to terminate a computation, means for holding the remainder of said keys in each bank out of operating positions, and means carried by said pawl arms and operated by a key in operating position to engage the pawl arm with a corresponding segment to release the same from its sector and carry the segment with the respective pawl arm.

28. In a calculating machine, an operating shaft having a continuous movement always in one direction for any calculation, a plurality of pawl arms keyed thereto, a toothed sector fixed adjacent each pawl arm, a toothed segment normally locked to each sector, a plurality of manually operative keys arranged in plus and minus banks numbered from zero to nine and movable into and out of operative positions, means for holding the zero key in operative positions normally, the plus zero key serving to initiate and the minus zero key to terminate a computation, means for engaging each segment with the corresponding pawl arm to carry the former with the latter, and means on each pawl operable by a key in operating position in the respective bank for releasing the segment from the respective pawl arm to permit its reëngagement with its sector.

29. In a calculating machine, an operating shaft, a plurality of pawl arms keyed thereto, a toothed sector fixed adjacent each pawl arm, a toothed segment normally locked to each sector, a plurality of manually operative keys arranged in banks in turn arranged in pairs and movable into and out of the path of movement of the respective pawl arms, means on said pawls for operating contact with a key in operative position in one bank of a pair to engage the respective segment and carry the same along, and means on said pawl arms for operating contact with a key in operating position in the other bank of a pair to release said segment from said pawl arm to permit its reengagement with its sector.

30. In a calculating machine, an operating shaft, a plurality of pawl arms keyed thereto, a toothed sector fixed adjacent each pawl arm, a toothed segment normally locked to each sector, a plurality of manually operative keys arranged in banks in turn arranged in pairs and movable into and out of the path of movement of the respective pawl arms, means on each pawl arm contacting with a key in operative position in one bank of the respective pair to engage with and move the corresponding segment, means on said pawl arm contacting with a key in operative position in the other bank of said pair to release said segment to permit its reëngagement with its sector, grooved drums operable by said segments, a plurality of change stacks, and controls for said stacks in turn controlled by the positions of said drums, to deliver a desired amount of change.

31. In a calculating machine, an operating shaft, a bank of keys, each key being movable into and out of operating position, a pawl arm keyed to said shaft and movable adjacent to and parallel with the said bank of keys, a change selecting mechanism, and means on said pawl arm depressible by a key in operative position in said bank for locking said pawl arm and change selecting mechanism together.

32. In a calculating machine, an operating shaft, a pair of banks of manually operable keys, a pawl arm keyed to said shaft and movable adjacent said banks of keys, a change selecting mechanism, means on said pawl depressible by a key in operative position in one of said banks to lock said pawl arm and change mechanism together, and means on said pawl arm depressible by a key in operative position in the other bank to unlock said pawl arm from said change mechanism.

33. In a calculating machine, an operating shaft, a pawl arm keyed thereto, a pair of banks of keys movable into and out of the path of movement of said pawl arm, a change selecting mechanism, a rocking frame on said pawl arm, means on said frame for locking the same to said pawl arm in either of two positions, means on the forward end of said frame contacting with a depressed key in one of said banks to rock said frame and engage the same with said change mechanism, and means on the rear of said frame contacting with a depressed key in the other of said banks to rock said frame to normal position and release the same from said change mechanism.

34. In a calculating machine, an operating shaft, a pawl arm keyed thereto, a pair of banks of keys movable into and out of the path of movement of said pawl arm, a toothed sector fixed adjacent said pawl arm, a toothed segment rotatable about said shaft and normally locked to said sector, means on said pawl arm contacting with a depressed key in one of said banks for locking said pawl arm to said segment, means on said pawl arm contacting with a depressed key in the other of said banks for releasing said pawl arm from said segment, a grooved drum rotatable by said segment, a change stack, a control for said stack in turn controlled by said drum, and means for ejecting change from said stack, the grooves in said drum being of various depths to permit the ejection of one or more units of change.

35. In a calculating machine, an operating shaft, a pawl arm keyed thereto, a pair of banks of keys movable into and out of the path of movement of said pawl arm, a toothed sector fixed adjacent said pawl arm, a toothed segment normally locked to said sector, means for locking and for unlocking said pawl arm to and from said segment at points determined by the positions of depressed keys in both of said banks, a grooved drum rotatable by said segment, a setting drum rotatable by said segment, a change stack, a control therefor in turn controlled by said grooved drum, means for moving said setting drum axially, and means on said setting drum for sliding said control above a groove in said grooved drum to permit ejection of said change.

36. In a calculating machine, a plurality of pairs of banks of keys, means for holding certain keys in depressed position, a toothed segment in the approximate plane of each bank of keys, means for moving said segments at times and for distances determined by the depressed ones of said keys, a grooved drum rotatable by one of said segments, a grooved drum and a setting drum rotatable by the other of said segments, a plurality of change stacks, a control for each stack arranged over the respective grooved drums and provided with arms adapted to enter selected grooves in both drums, means for moving said setting drum axially, a toe on said control arranged adjacent said setting drum, and means on said setting drum for sliding said control to carry its arms into positions over certain grooves in said grooved drums.

37. In a calculating machine, a plurality of pairs of banks of keys, means for holding certain keys in depressed position, a toothed segment in the approximate plane of each bank of keys, means for moving said segments at times and for distances determined by the depressed ones of said keys, a grooved drum rotatable by each of said segments, a setting drum also rotated by one of said segments, a plurality of change stacks, a control for each provided with an arm over each of the said grooved drums and with a toe adjacent said setting drum, means on one segment for moving said setting drum axially, and a vane of undulated formation on said setting drum for sliding the respective controls over selected grooves in both grooved drums to permit ejection of change from the respective stacks.

38. In a calculating machine, a plurality of pairs of banks of keys, means for holding certain keys in depressed position, a toothed segment in the approximate plane of each bank of keys, means for moving said segments at times and for distances determined by the depressed ones of said keys, a grooved drum rotatable by each of said segments, a setting drum also rotatable by one of said segments, a plurality of change stacks, a control for each provided with an arm over each of said grooved drums and with a toe adjacent said setting drum, means on one segment for moving said setting drum axially, an undulated vane on said setting drum for sliding the respective controls over selected grooves in both grooved drums to permit ejection of change from the respective stacks, and complemental undulated vanes on one of said grooved drums for returning said controls to normal positions.

39. In a calculating machine, an operating shaft, a plurality of pawl arms keyed thereto, a toothed sector in fixed position adjacent each pawl arm, a toothed segment normally locked to each sector, a plurality of manually operative keys movable into and out of the path of movement of said pawl arms, means on said pawl arms operable by the respective keys, when in operating positions, for engaging the respective segment to carry the same therewith, means on said pawl arms for contact with the respective keys to disengage the pawl arms from the respective segments, and means on said pawl arms for returning said segments to normal positions when said pawl arms resume normal positions, after a machine operation.

40. In a calculating machine, an operating shaft, a plurality of pawl arms keyed thereto, a toothed sector in fixed position adjacent each pawl arm, a toothed segment normally locked to each sector, a plurality of manually operative keys movable into and out of the path of movement of said pawl arms, means on said pawl arms operable by the respective keys, when in operating positions, for engaging the respective segments to carry the same therewith, means on said pawl arms for contact with the respective keys to disengage the pawl arms from the respective segments, and a display-wheel bearing numerals in operative connection with each segment, said display-wheels being visible at a window common to all to show the extent of movement of the moved segments.

41. In a calculating machine, an operating shaft, a plurality of pawl arms keyed thereto, a toothed sector in fixed position adjacent each pawl arm, a toothed segment normally locked to each sector, a plurality of manually operative keys movable into and out of the path of movement of said pawl arms, means on said pawl arms operable by the respective keys, when in operating positions, for engaging the respective segments to carry the same therewith, means on said pawl arms operable with the respective keys for disengaging the pawl arms from the respective segments, a segment gear carried by each segment, a plurality of nested shafts, a pinion on each of said nested shafts enmeshed with the respective segment gears, and a display-wheel in operative connection with the respective nested shafts, said wheels bearing numerals and being all visible at a window common to all.

42. In a calculating machine, an operating shaft, a pawl arm keyed thereto, a fixed stepped sector adjacent said pawl arm provided with two separate toothed portions, a plus register arm normally locked to said pawl arm and adapted to be released therefrom and to be locked to one portion of said sector, a minus register arm normally locked to the other portion of said sector and adapted to be released therefrom and locked to said pawl arm, and a plurality of manually operable keys adapted to be moved into and out of the path of said pawl arm to control the times and distances of movement of said register arms by said pawl arm.

43. In a calculating machine, an operating shaft, a pawl arm keyed thereto, a fixed stepped sector adjacent said pawl arm provided with two separate toothed portions, a plurality of depressible keys adapted to be moved into and out of the path of movement of said pawl arm, a plus register arm normally locked to said pawl arm, a minus register arm normally locked to one portion of said sector, and means on said pawl arm actuated by depressed ones of said keys for moving said arms at times and for distances determined by said depressed keys.

44. In a calculating machine, an operating shaft, a pawl arm keyed thereto, a fixed stepped sector adjacent said pawl arm provided with two separate toothed portions, a plurality of depressible keys adapted to be moved into and out of the path of movement of said pawl arm, a plus register arm normally locked to said pawl arm and adapted to be released therefrom and to be locked to one portion of said sector, a minus register arm normally locked to the other portion of said sector and adapted to be released therefrom and locked to said pawl arm, and means on said pawl arm actuated by depressed keys for releasing and engaging said register arms to move the same at times and for distances determined by the depressed ones of said keys.

45. In a calculating machine, an operating shaft, a pawl arm keyed thereto, a fixed stepped sector adjacent said pawl arm provided with two separate toothed portions, a plurality of depressible keys adapted to be moved into and out of the path of movement of said pawl arm, a plus register arm normally locked to said pawl arm and adapted to be released therefrom and to be locked to one portion of said sector, a minus register arm normally locked to the other portion of said sector and adapted to be released therefrom and to be locked to said pawl arm, means on said pawl arm actuated by depressed keys for releasing and engaging said register arms to move the same at times and for distances determined by the depressed ones of said keys, and means on said pawl arm for returning said register arms to normal positions after machine operation.

46. In a calculating machine, an operating shaft, a pawl arm keyed thereto, a fixed stepped sector adjacent said pawl arm provided with two separate toothed portions, a plurality of depressible keys adapted to be moved into and out of the path of movement of said pawl arm, a plus register arm, a minus register arm, means on said pawl arm operable by depressed ones of said keys for moving said register arms at times and for distances determined by the depressed ones of said keys, and means for returning said register arms to normal positions, said minus register arm being movable only at the completion of movement of said plus register arm.

47. In a calculating machine, an operating shaft, a plurality of pawl arms keyed thereto, a fixed stepped sector adjacent each pawl arm, a plurality of depressible keys movable into and out of the path of movement of each pawl arm, a plus register arm and a minus register arm for each pawl arm, means on each pawl arm operable by the depressed ones of said keys corresponding to said pawl arm for moving said register arms at times and for distances determined by the respective depressed keys, a display-wheel in operative connection with each plus register arm, said display-wheels being visible at a window common to all to indicate an amount of money received, and a display-wheel in operative connection with each minus register arm, said minus display-wheels being visible at another window to indicate the amount of a purchase.

48. In a calculating machine, an operating shaft, a plurality of pawl arms keyed thereto, a fixed stepped sector adjacent each pawl arm, a plurality of depressible keys movable into and out of the path of movement of each pawl arm, a plus register arm and a minus register arm for each pawl arm, means on each pawl arm operable by the respective depressed keys to move said register arms at times and for distances determined by the respective depressed keys, display-wheels in operative connection with said plus register arms to indicate the amount of money received, display-wheels in operative connection with said minus register arms to indicate the amount of a purchase, and a totalizer in operative connection with said minus register arms to record the total of sales.

49. In a calculating machine, a plurality of selectively moved minus register arms, and a totalizer in operative connection with all of said arms, said totalizer comprising a plurality of nested shafts, a disk bearing numerals on the outer end of each shaft and one numeral of each of said disks being visible at a common window, a supplemental disk bearing numerals operable one step in each revolution of one of said disks to carry a numeral thereon to said window, means for revolving each of said first named disks step by step successively, and means for preventing backward movement of said disks in the return movement of said arms to normal positions.

50. In a calculating machine, a plurality of depressible keys arranged in banks, an operating shaft, a change selecting mechanism in operative connection with said shaft and controlled by depressed ones of said keys, a lock arm keyed to said shaft and provided with ratchet teeth, a pawl engaging said teeth to prevent backward movement of said arm, a re-set key for releasing said pawl to permit backward arm movement, and means for preventing actuation of said re-set key before said lock arm has reached its full forward limit of movement.

51. In a calculating machine, a plurality of depressible keys arranged in banks, an operating shaft, a change selecting mechanism in operative connection with said shaft and controlled by depressed ones of said keys, a lock arm keyed to said shaft, a setting arm keyed to said shaft, an ejector arm adjacent each of said lock and setting arms, means for normally locking said ejector arms in position, and means on said lock and setting arms for unlocking said ejector arms and means thereon for locking said ejector arms thereto.

52. In a calculating machine, a plurality of depressible keys, arranged in banks, an operating shaft, a change selecting mechanism in operative connection with said shaft, and controlled by the depressed ones of said keys, means for holding the depressed keys in depressed positions, an ejector arm at each end of said machine, means for moving said ejector arms, and means connected with said ejector arms for releasing the depressed keys when said arms have reached the forward limit of movement, approximately.

53. In a calculating machine, a plurality of depressible keys arranged in banks, an operating shaft, a change selecting mechanism in operative connection with said shaft and controlled by the depressed ones of said keys, a plurality of change stacks, a piston movable in each stack under the control of said change selecting mechanism, a lock bar normally preventing piston movement, a dog having a cam thereon at each end of said lock bar, and means in operative connection with said shaft for actuating said dogs to lower said lock bar to permit stack piston movement.

54. In a calculating machine, a plurality of depressible keys arranged in banks, an operating shaft, a change selecting mechanism in operative connection with said shaft and controlled by the depressed ones of said keys, a plurality of change stacks, a piston in each stack controlled by said change selecting mechanism, a lock bar passed beneath all of said pistons to prevent downward movement thereof, a cam dog at each end of said lock bar, means on said shaft for tripping said dogs to lower said lock bar to permit piston movement, and means for returning said dogs and lock bar to normal positions.

55. In a calculating machine, an operating shaft, a change selecting mechanism including computing units movable in one direction throughout their computing operations, a plurality of manually operable keys movable into and out of the path of movement of said selecting mechanism, and a transfer mechanism for borrowing by one digit from an adjacent digit consisting of a plurality of members, one for each digit other than the one at the extreme left, independently operable by the selecting mechanism of one digit into the path of movement of the selecting mechanism of the left hand adjacent digit.

56. In a calculating machine, an operating shaft, a change selecting mechanism including computing units movable in one direction throughout their computing operations, a plurality of manually operable keys movable into and out of the path of movement of said selecting mechanism, and a transfer mechanism for borrowing by one digit from an adjacent digit consisting of a plurality of members rotatable on the same axis and independently operable by the selecting mechanism of one digit into the path of movement of the selecting mechanism of the left hand adjacent digit.

57. In a calculating machine, an operating shaft, a change selecting mechanism including computing units movable in one direction throughout their computing operations, a plurality of manually operable keys movable into and out of the path of movement of said selecting mechanism, and a transfer mechanism for borrowing by one digit from an adjacent digit consisting of a plurality of members rotatably actuated by the selecting mechanism of one digit into the path of movement of the selecting mechanism of the left hand adjacent digit, and slidably actuated into such position when the next member to the right is in operative position.

58. In a calculating machine, an operating shaft, a change selecting mechanism including computing units movable in one direction throughout their computing operations, a plurality of manually operable keys movable into and out of the path of movement of said selecting mechanism, and a transfer mechanism for borrowing by one digit from an adjacent digit consisting of a plurality of independently rotated members actuated into operative positions by the selecting mechanisms of the respective digits into the path of movement of the selecting mechanism of the left hand adjacent digit, and slidably actuated into operative position when the next member to the right is in operative position, adjacent members carrying clutch members having complemental cam faces to rotate the slidable member.

59. In a calculating machine, an operating shaft, a change selecting mechanism including a unit movable in one direction throughout its operation for each digit within the limits of the machine, a plurality of manually operable keys movable into and out of the path of movement of each selecting unit, and a transfer mechanism for borrowing by one digit from an adjacent digit consisting of a plurality of independently operated members actuated by the respective selecting unit to move into the path of movement of the next selecting unit.

60. In a calculating machine, an operating shaft, a change selecting mechanism including a unit movable in one direction throughout its operation for each digit within the limits of the machine, a plurality of manually operable keys movable into and out of the path of movement of each selecting unit, and a transfer mechanism for borrowing by one digit from an adjacent digit consisting of a plurality of rotatable members on the same axis, each of said members being provided with a lug engaged by one selecting unit to rotate the respective member to move a second lug into the path of movement of the adjacent selecting unit at the left.

61. In a calculating machine, an operating shaft, a change selecting unit movable in one direction throughout its operation for each digit within the limits of the machine, a plurality of manually operable keys movable into and out of the path of movement of each selecting unit, and a transfer mechanism for borrowing by one digit from an adjacent digit consisting of a plurality of normally independent members rotatable by one selecting unit into the path of movement of the adjacent selecting unit to the left, and means for sliding said members into engagement whereby all of said members will be rotated by the rotation of the right hand member.

62. In a calculating machine, an operating shaft, a change selecting unit movable in one direction throughout its operation for each digit within the limits of the machine, a plurality of manually operable keys movable into and out of the path of movement of each selecting unit, and a transfer mechanism for borrowing by one digit from an adjacent digit consisting of a plurality of normally independent members rotatable by the respective selecting units into the path of movement of the adjacent selecting units at the left, and means for sliding desired ones of said members into locked engagement to rotate in unison.

63. In a calculating machine, an operating shaft, a plurality of pawl arms keyed thereto, a plurality of keys arranged in banks in turn arranged in pairs and movable into and out of the path of movement of the respective pawl arms, a rocking frame on each pawl arm, means for locking each frame in either of two positions, means on the forward end of each frame operable by the respective key in operative position for moving said frame from one position to the other, means on the rear of said frame for rocking the same into normal position, a normally stationary segment adjacent each pawl arm, means on each frame for engagement with the respective segment when said frame is in alternative position by means of one set key and released therefrom by means of another set key, change selecting mechanism for each segment, a transfer consisting of a plurality of independently operable members operated by an arcuate member on one segment to move a lug into the path of movement of the adjacent pawl arm to the left to move the frame thereof into alternate position to reëngage the respective segment, and a fixed tooth adapted to move said frame into normal position to disengage said frame from said segment after a movement of one space to reduce the digit value of the digit of the frame so rocked by one to borrow therefrom by the adjacent digit to the right, in subtraction.

64. In a calculating machine, an operating element having a continuous movement always in one direction for any calculation, a plurality of manually operable keys, and a computing mechanism including means movable less than ten spaces for subtracting a smaller from a larger digit, movable ten spaces for subtracting digits of equal values, and movable more than ten spaces for subtracting a larger from a smaller digit.

65. In a calculating machine, an operating element, a plurality of manually operative keys arranged in plus and minus banks, a computing unit operable in one direction throughout its computing operations, and means for moving said unit a number of spaces equaling the decimal complement of the value of an operated plus key plus the number of spaces equaling the value of an operated minus key to subtract the value of said minus key from the value of said plus key.

66. In a calculating machine, an operating element, a plurality of manually operative keys arranged in plus and minus banks, a computing unit for each digit of a number operable in one direction throughout its computing operations, means for moving one of said units a number of spaces equaling the decimal complement of the value of an operated plus key plus the number of spaces equaling the value of an operated minus key to subtract the value of said minus key from the value of said plus key, and means for moving an adjacent unit one space, when said first named unit moves more than ten spaces, to borrow from said adjacent unit.

67. In a calculating machine, an operating element, a plurality of manually operative keys arranged in plus and minus banks, a computing unit operable in one direction throughout its computing operations, means for moving said unit a number of spaces equaling the decimal complement of the value of an operated plus key plus a number of spaces equaling the value of an operated minus key to subtract the value of said minus key from the value of said plus key, and means for delivering change amounting to the difference between the value of an operated plus key, representing an amount of money tendered, and the value of an operated minus key, representing the amount of a purchase.

68. In a calculating machine, an operating element, a plurality of depressible keys arranged in banks, a computing mechanism, means operable by a depressed key in one bank for locking said mechanism to said element to move therewith, and means operable by a depressed key in another bank for unlocking said mechanism from said element to permit further movement of said element only.

69. In a calculating machine, an operating element, a plurality of manually operative keys arranged in banks, a computing mechanism, key controlled means for controlling said mechanism by locking the same to and unlocking the same from said element, and a transfer mechanism for locking said computing mechanism to said element to borrow by one digit from another.

70. In a calculating machine, an operating element, a plurality of manually operative keys arranged in banks, a computing mechanism, key controlled means for controlling said mechanism by locking the same to and unlocking the same from said element, a transfer mechanism for locking said computing mechanism to said element to borrow by one digit from another, and means for unlocking said computing mechanism from said element upon the completion of a movement of one space by said computing mechanism after being locked to said element by said transfer mechanism.

71. In a calculating machine, an operating element, a plurality of manually operative keys arranged in banks, a plurality of computing elements, and transfer mechanisms associated with the computing elements and set in any order into operative position and all set transfer mechanisms being adapted to perform their respective transfers simultaneously on the operative stroke of the operating element, said transfer mechanism including means coöperating with the first-mentioned means after the latter has finished its movement for columnar computations to lock the computing and operating elements together to move as a unit.

72. In a calculating machine, an operating element, a plurality of computing elements, means adapted to positively connect each computing element with the operating element, and transfer mechanism associated with the computing elements and adapted to be set in any order to actuate the said means for connecting the computing elements with the operating elements and all set transfer mechanisms being adapted to perform their respective transfers simultaneously by the operative stroke of the operating element, said transfer mechanism including means coöperating with the first-mentioned means after the latter has finished its movement for columnar computations to lock the computing and operating elements together to move as a unit.

JAMES R. COMBS.